US011389696B2

(12) United States Patent
Powers et al.

(10) Patent No.: US 11,389,696 B2
(45) Date of Patent: Jul. 19, 2022

(54) ATHLETIC ACTIVITY TRACKING AND PERSONALIZED UPDATES BASED THEREON

(71) Applicant: Outside Interactive, Inc., Boulder, CO (US)

(72) Inventors: Rani K. Powers, Arvada, CO (US); Christopher M. Glode, Denver, CO (US); Ryan P. Trunck, Denver, CO (US)

(73) Assignee: Outside Interactive, Inc., Boulder, CO (US)

( * ) Notice: Subject to any disclaimer, the term of this patent is extended or adjusted under 35 U.S.C. 154(b) by 112 days.

(21) Appl. No.: 17/123,554

(22) Filed: Dec. 16, 2020

(65) Prior Publication Data

US 2022/0184454 A1 Jun. 16, 2022

(51) Int. Cl.
*A63B 24/00* (2006.01)
*G06Q 30/02* (2012.01)

(52) U.S. Cl.
CPC ...... *A63B 24/0062* (2013.01); *A63B 24/0075* (2013.01); *G06Q 30/0201* (2013.01); *G06Q 30/0255* (2013.01); *A63B 2024/0068* (2013.01); *A63B 2024/0071* (2013.01); *A63B 2225/50* (2013.01)

(58) Field of Classification Search
CPC ............ A63B 24/0062; A63B 24/0075; A63B 2024/0068; A63B 2024/0071; A63B 2225/50; G06Q 30/0201; G06Q 30/0255
USPC .......................................... 705/14.53; 482/8
See application file for complete search history.

(56) References Cited

U.S. PATENT DOCUMENTS

| 2007/0219059 | A1* | 9/2007 | Schwartz | A61B 5/02405 482/8 |
| 2019/0311539 | A1* | 10/2019 | Hogue | G02B 27/0172 |
| 2020/0054931 | A1* | 2/2020 | Martin | A61B 5/486 |
| 2022/0108325 | A1* | 4/2022 | Trunck | G06Q 30/016 |

FOREIGN PATENT DOCUMENTS

WO WO-02067449 A2 * 8/2002 ........... A61B 5/0022

OTHER PUBLICATIONS

Abhas Ricky, How Data Analysis In Sports Is Changing The Game, 2019 (Year: 2019).*

* cited by examiner

*Primary Examiner* — Tarek Elchanti
(74) *Attorney, Agent, or Firm* — Duft & Bornsen, PC

(57) ABSTRACT

Systems and methods are provided for generating and provisioning personalized news feeds for athletes. One embodiment is a system that receives metrics for exercise activities performed by athletes. The system generates records of the exercise activities of the athletes based on the metrics, determines a type of exercise for each record, classifies the records based on corresponding types of exercise, and compiles a fitness history, for each athlete, comprising records of exercise activities performed by the athlete. For each of the athletes, the system generates a digital news feed for the athlete, identifies categories of engagement for the athlete based on types of exercise indicated in the fitness history of the athlete, selects articles from a repository, personalizes the digital news feed for the athlete by populating the digital news feed with the selected articles, and transmits the digital news feed to a user device.

11 Claims, 17 Drawing Sheets

DATA NORMALIZATION

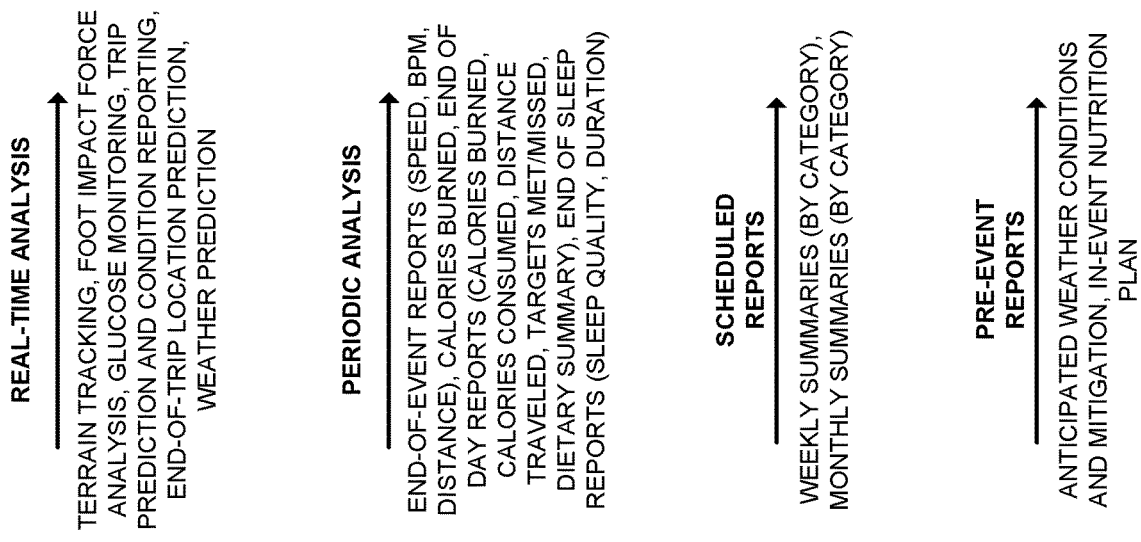
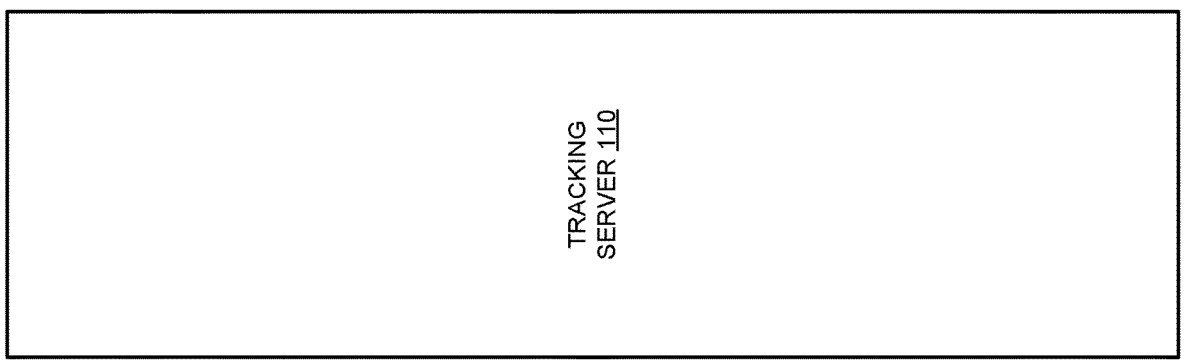
FIG. 7
AGGREGATION OF SERVER INPUTS/ OUTPUTS

FIG. 8
PROFILE

| ID | 19593020 |
|---|---|
| ATHLETICS | DISTANCE RUNNING, CROSS-FIT, CLIMBING |
| SUBSCRIPTIONS | TRIATHLETE, BETTER NUTRITION, WOMEN'S RUNNING |
| DEMOGRAPHICS | AGE 18-35, FEMALE, HIGH INCOME |
| HISTORY | 11/13 DISTANCE RUN (5.4 KM), 11/14 SPRINT WORKOUT (1.5 HRS), ... |
| PREFERENCES | PREFERRED: HYPERLITE RUNNING SHOES, MAX-WIN SPORTS TOPS. EXCLUDED: SO-FAST RUNNING SHOES |
| CURRENT EQUIPMENT | DISTANCE-SHOE-03, SOCCER-SHOE-02, TRACK-CLEATS-01 |
| INTERESTS | HIKING, NATURE, TRAVEL, GLUTEN-FREE NUTRITION, HYBRID CARS, PAINTING |

800

FIG. 9
PROFILE

| ID | 31655416 |
|---|---|
| ATHLETICS | ROAD CYCLING, CLIMBING |
| SUBSCRIPTIONS | TRIATHLETE, GYM CLIMBER, ROCK AND ICE |
| DEMOGRAPHICS | AGE 65-75, MALE, LOW INCOME |
| HISTORY | 11/25 BENCH LIFTING WORKOUT (1 HR), 11/28 FREE WEIGHT WORKOUT (35 MIN), ... |
| PREFERENCES | PREFERRED: NONE. EXCLUDED: NONE |
| CURRENT EQUIPMENT | LIFTING-KETTLEBELLS-01, LIFTING-KETTLEBELLS-02, LIFTING-BENCH-01, AEROBICS-PLYO BOX-01 |
| INTERESTS | LITERATURE, NEWS, FINANCIAL PLANNING, AUTOMOBILES |

900

FIG. 10
RECORD

| EVENT ID | AE5235465165469 |
|---|---|
| TIME | 2020-02-14,18:24:09 GMT - 2020-02-14,20:41:32 GMT |
| METRICS | 11,733 STEPS (8.4KM), AVG BPM 125, PEAK BPM 160, ELEV. CHANGE 800M, AVG SPEED 6.2 MPH, ELAPSED TIME 52:23 |
| LOCATION HISTORY | [LOCATIONS.CSV], [VELOCITIES.CSV] |
| TYPE | DISTANCE RUNNING (COMPETITIVE), MEDIUM INTENSITY, INTERMEDIATE EXPERIENCE |
| ATHLETE FEEDBACK | +PAINFUL SIDE CRAMP, +LACK OF ENERGY, +COTTON MOUTH |
| ANALYSIS | BPM OVER DESIRED PEAK, PACE LOWER THAN TARGET, FEEDBACK INDICATES LACK OF HYDRATION BEFORE EVENT |

1000

FIG. 11
RECORD

| EVENT ID | UK616519975 |
|---|---|
| TIME | 2020-02-17,15:24:09 GMT - 2020-02-17,18:00:22 GMT |
| METRICS | 88 KM, AVG BPM 140, PEAK BPM 175, ELEV. CHANGE 1200M, AVG SPEED 22.4 MPH, ELAPSED TIME 2:36:13 |
| LOCATION HISTORY | [LOCATIONS.CSV], [VELOCITIES.CSV] |
| TYPE | ROAD CYCLING, HIGH INTENSITY, INTERMEDIATE EXPERIENCE |
| ATHLETE FEEDBACK | +HIGH ENERGY |
| ANALYSIS | CURRENT TIRE MILEAGE INDICATES REPLACEMENT IS NECESSARY |

1100

FIG. 12
EQUIPMENT PROFILE

| EQUIPMENT ID | DISTANCE-SHOE-03 |
|---|---|
| DELIVERY DATE | 2020-02-02,14:07:00 GMT |
| USAGE METRICS | 200KM TRAVELED (291,630 STEPS), 520M ELEVATION CHANGE, 85 DAYS OLD |
| EQUIPMENT LIFETIME | LESSER OF: 750KM, 900,000 STEPS, 50KM ELEVATION CHANGE, 365 DAYS OLD |
| COMPONENTS | NONE |
| LIFETIME PCT LEFT | 67.5 |

1200

FIG. 13
EQUIPMENT PROFILE

| EQUIPMENT ID | ROAD-BIKE-01 |
|---|---|
| DELIVERY DATE | 2017-04-27,11:07:00 GMT |
| USAGE METRICS | 18,720KM TRAVELED, 3,600M ELEVATION CHANGE, 85 DAYS OLD |
| EQUIPMENT LIFETIME | LESSER OF: 750KM, 50 KM ELEVATION CHANGE, 10 YEARS OLD |
| COMPONENTS | ROAD-TIRES-04, ROAD-COGSET-02, ROAD-BRAKES-13 |
| LIFETIME PCT LEFT | 85.2 |

1300

FIG. 14
EQUIPMENT PROFILE

| EQUIPMENT ID | ROAD-TIRES-04 |
|---|---|
| DELIVERY DATE | 2020-06-13,15:22:19 GMT |
| USAGE METRICS | 1,167KM TRAVELED, 400M ELEVATION CHANGE, 32 DAYS OLD |
| EQUIPMENT LIFETIME | LESSER OF: 6,000KM, 2 YEARS OLD |
| COMPONENTS | NONE |
| LIFETIME PCT LEFT | 70.5 |

1400

FIG. 15
CATEGORIES OF ENGAGEMENT

| SPORT | RUNNING | CYCLING | SWIMMING | CLIMBING |
|---|---|---|---|---|
| EXPERIENCE LEVEL | INTERMEDIATE | ADVANCED | EXPERT | BEGINNER |
| INTENSITY LEVEL | LOW | HIGH | HIGH | HIGH |
| WEATHER TOLERANCE | ANY | CLEAR | N/A | CLEAR |
| TERRAIN TYPE | PAVED, TRAIL | PAVED | INDOOR | OUTDOOR |

FIG. 16
ARTICLE LISTING

| ID | 5217568419 | 1837765845 | 6500023178 | 1733558746 |
|---|---|---|---|---|
| TITLE | BOULDERING BASICS | THE BEST ROAD BIKES | RUN LIKE A PRO IN THE MUD | CYCLING IN THE RAIN |
| SOURCE | ROCK AND ICE | TRIATHLETE | PODIUMRUNNER | TRIATHLETE |
| SPORT | CLIMBING | CYCLING, TRIATHLON | RUNNING | CYCLING |
| TAGS | BEGINNER, OUTDOOR | PAVED, GEAR | OUTDOOR, BAD WEATHER | BAD WEATHER |

FIG. 17
ADVERTISEMENTS 1700

1710

| ID | OTS-1463 (1712) | OF-05255 (1714) | FCC-56463 (1716) |
|---|---|---|---|
| PRODUCT/SERVICE | OMEGA TRAIL SHOE | OVERTOP FLEECE | FREECLIMB COACHING CLASSES |
| SPORT | RUNNING | HIKING, RUNNING | CLIMBING |
| EXPERIENCE | INTERMEDIATE | ANY | EXPERT |
| WEATHER TOLERANCE | ANY | COLD | N/A |
| TERRAIN TYPE | TRAIL, DIRT, MUD | TRAIL, DIRT, MUD | OUTDOOR |

FIG. 18
PRIORITIZATION DIRECTIVE 1800

1810

| | RUNNING (1812) | TRIATHLON (1814) | SWIMMING (1816) | CLIMBING (1818) |
|---|---|---|---|---|
| SPORT | | | | |
| EXPERIENCE LEVEL | ANY | ANY | EXPERT | ANY |
| INTENSITY LEVEL | ANY | HIGH | HIGH | ANY |
| DEMOGRAPHICS | FEMALE | ANY | N/A | ANY |
| PROVIDE ARTICLES FROM.... | WOMEN'S RUNNING | TRIATHLETE | TRIATHLETE | GYM CLIMBER |

| FEED POSITION | ARTICLE ID | PRESENTATION INSTRUCTIONS |
|---|---|---|
| 1 | 534534-66 | |
| 2 | 235321-71 | EMPHASIZE |
| 3 | 693296-41 | |
| 4 | 509232-05 | |
| 5 | ADVERT: OFP-442 | FLYING CARPET |
| 6 | 121519-66 | |
| 7 | 515165-11 | EMPHASIZE |

1900

HIGH LEVEL PERFORMER – RUNNING (COMPETITION FOCUS)

FIG. 21
HIGH LEVEL PERFORMER – TRIATHLON (BALANCED)

2100

YOUR NEWSFEED

CAFFEINE CAN KICKSTART YOUR WORKOUT BUT BEWARE ITS EFFECT ON YOUR GUT
2112

ASK A GEAR GURU: WHAT'S THE BEST WAY TO CLEAN A BIKE CHAIN?
2114

THE MATURE ATHLETE: WHY TRIATHLON IS THE BEST SPORT FOR AGING ATHLETES
2116

GET THE BIKE YOU DESERVE
2120

CASUAL RUNNER – HEALTH FOCUS

ATHLETIC ACTIVITY TRACKING AND PERSONALIZED UPDATES BASED THEREON

FIELD

The disclosure relates to the field of athletics, and in particular, to tracking athletic activities.

BACKGROUND

Athletes perform at a variety of levels of competitiveness and intensity in order to achieve varying goals. Thus, the population of athletes runs the gamut from casual athletes who seek physical fitness, to professional athletes that work with an elite cadre of trainers and nutritionists in order to achieve a competitive edge in sporting events. The depth of knowledge of each athlete in relation to her workout regimen therefore varies widely. Furthermore, the type of training engaged in by athletes varies widely.

Therefore, it would be desirable to have a method and apparatus that take into account at least some of the issues discussed above, as well as other possible issues.

SUMMARY

Embodiments described herein provide for advanced network architectures that are capable of tracking the actions of a population of athletes on an individualized and/or ongoing basis. The tracking may be performed on a massive scale for a population of thousands or millions of athletes at once, and hence the systems and methods described herein enable dynamic activity tracking and article delivery in a manner that is not possible by hand or as a mental process.

These embodiments provide articles such as those describing nutrition, training regimens, and/or sporting news to athletes in the population. The articles for each athlete are selected based on a history of exercise performed by that specific athlete. Thus, instead of delivering articles based only on the expressed interests of athletes and demographics of athletes, the embodiments described herein are capable of delivering articles and other information based on an analysis of the actual fitness history of each athlete. In further embodiments, these systems and methods may even detect an athlete reaching a new threshold at which an athlete has achieved a notable increase in experience and/or workout intensity (referred to herein as a "transformation"). In response to an athlete reaching such a threshold, different types of articles may be provided in order to facilitate a more advanced training regimen for the athlete.

One embodiment is a system for personalized tracking and information delivery for athletes. The system includes a tracking server and an aggregation server. The tracking server receives metrics for exercise activities performed by athletes, each exercise activity comprising an instance of exercise performed by an athlete. The tracking server generates records of the exercise activities of the athletes based on the metrics, determines a type of exercise for each record, classifies the records based on corresponding types of exercise, and compiles a fitness history, for each athlete, comprising records of exercise activities performed by the athlete. The aggregation server, for each of the athletes: generates a digital news feed for the athlete, identifies categories of engagement for the athlete based on types of exercise indicated in the fitness history of the athlete, selects articles from a repository based on the categories of engagement for the athlete, personalizes the digital news feed for the athlete by populating the digital news feed with the selected articles, and transmits the digital news feed to a user device of the athlete for presentation at a display of the user device.

A further embodiment is a method for personalized tracking and information delivery for athletes. The method includes receiving metrics for exercise activities performed by athletes, each exercise activity comprising an instance of exercise performed by an athlete, generating records of the exercise activities of the athletes based on the metrics, determining a type of exercise for each record, classifying the records based on corresponding types of exercise, and compiling a fitness history, for each athlete, comprising records of exercise activities performed by the athlete. The method also includes, for each athlete: generating a digital news feed for the athlete, identifying categories of engagement for the athlete based on types of exercise indicated in the fitness history of the athlete, selecting articles from a repository based on the categories of engagement for the athlete, personalizing the digital news feed for the athlete by populating the digital news feed with the selected articles, and transmitting the digital news feed to a user device of the athlete for presentation at a display of the user device.

A further embodiment is a non-transitory computer readable medium embodying programmed instructions which, when executed by a processor, are operable for performing a method for personalized tracking and information delivery for athletes. The method includes receiving metrics for exercise activities performed by athletes, each exercise activity comprising an instance of exercise performed by an athlete, generating records of the exercise activities of the athletes based on the metrics, determining a type of exercise for each record, classifying the records based on corresponding types of exercise, and compiling a fitness history, for each athlete, comprising records of exercise activities performed by the athlete. The method also includes, for each athlete: generating a digital news feed for the athlete, identifying categories of engagement for the athlete based on types of exercise indicated in the fitness history of the athlete, selecting articles from a repository based on the categories of engagement for the athlete, personalizing the digital news feed for the athlete by populating the digital news feed with the selected articles, and transmitting the digital news feed to a user device of the athlete for presentation at a display of the user device.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 7 is a block diagram depicting a flow of messaging to and from a tracking server in an illustrative embodiment.

FIGS. 8-9 depict profiles of athletes in an illustrative embodiment.

FIGS. 10-11 depict records of exercise activities in an illustrative embodiment.

FIGS. 12-14 depict equipment profiles in an illustrative embodiment.

FIG. 15 depicts categories of engagement in an illustrative embodiment.

FIG. 16 depicts a listing of articles in an illustrative embodiment.

FIG. 17 depicts a set of advertisements in an illustrative embodiment.

FIG. 18 depicts prioritization directives indicating types of articles that are emphasized in a news feed in an illustrative embodiment.

FIGS. 20-22 depict news feeds that have been generated by an aggregation server based on personal fitness histories of specific athletes in illustrative embodiments.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Network Architecture Overview

Figure 1:
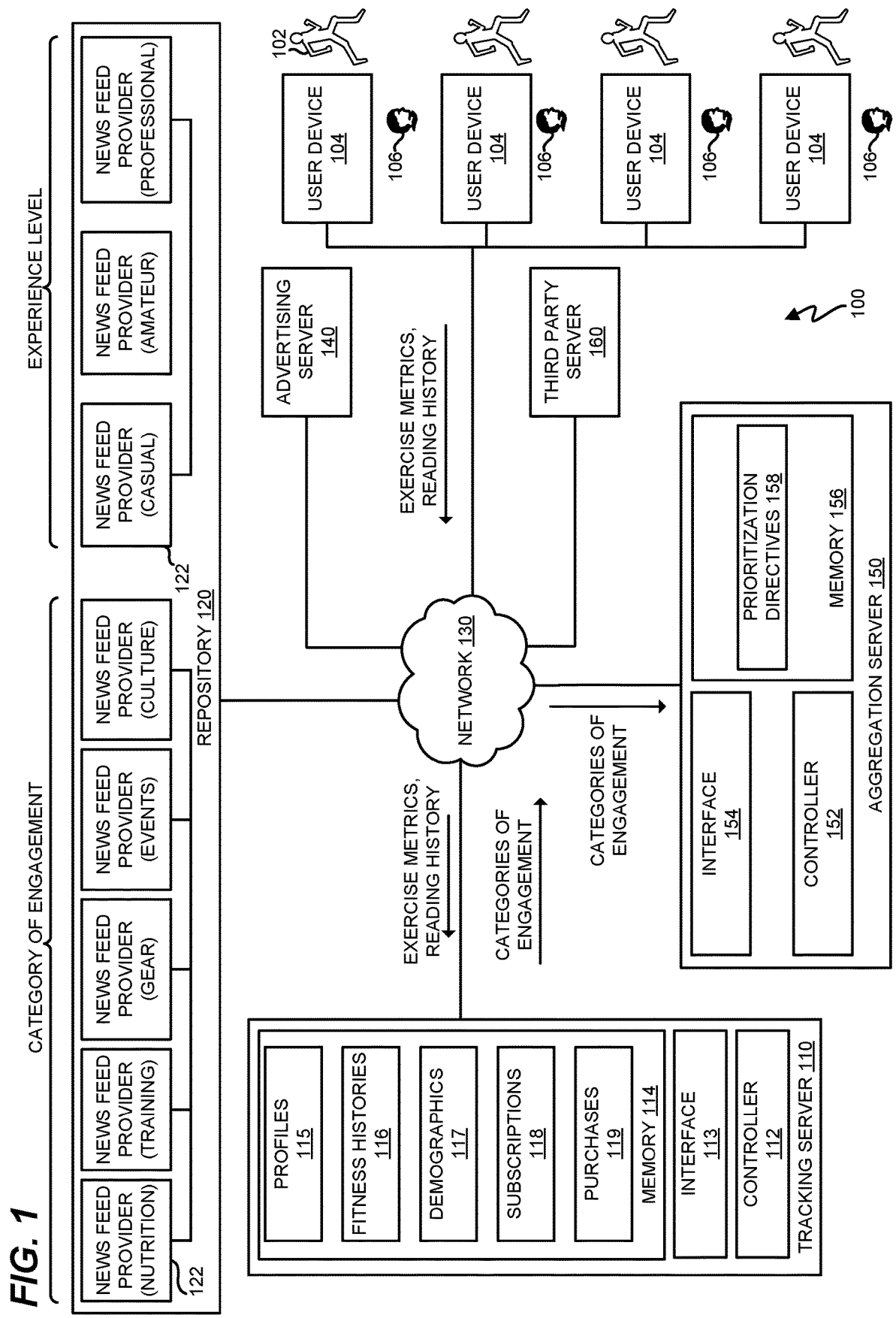
FIGS. 1-2 depict a network architecture for monitoring athletic activity and customizing news feeds in an illustrative embodiment.
Figure 2:
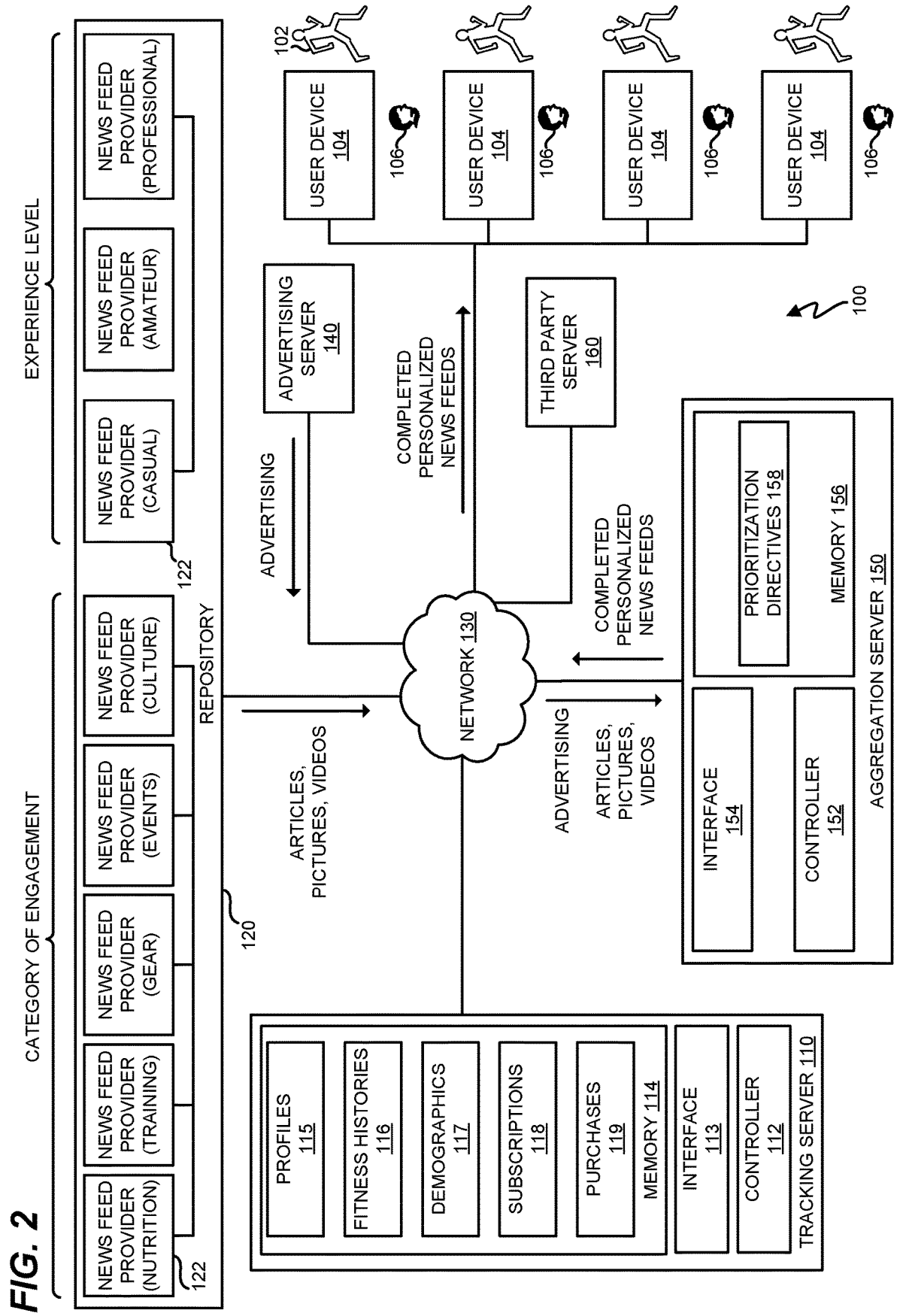

FIGS. 1-2 depict a network architecture 100 for monitoring athletic activity and customizing news feeds in an illustrative embodiment. Network architecture 100 comprises any system, device, or set of components that is capable of dynamically generating personalized news feeds for individuals within a population of athletes 102 (e.g., hundreds of thousands, or millions of athletes 102). The contents of each news feed for an athlete 102 are selected and/or arranged based on a history of prior exercise engaged in by that specific athlete 102. Thus, an athlete 102 that regularly engages in cycling may receive articles on cycling in their news feed, an athlete 102 that regularly engages in high-intensity cycling may receive more articles on intensive training regimens for cycling, an athlete that regularly engages in cycling events may receive more articles covering the results of recent cycling races, etc. As used herein, athletes 102 include individuals that exercise, physically train, or compete on a regular or periodic basis.

In this embodiment, network architecture 100 includes a variety of user devices 104. The user devices 104 may comprise mobile devices such as cellular phones or tablets, wearable fitness tracking devices (e.g., smart watches or wristbands that are worn by, accompany, or otherwise track an athlete 102 during exercise), and/or computers. The user devices 104 provide messaging to a tracking server 110 via a network 130 (i.e., a computer network such as the Internet, a cellular network, etc.). The messaging describes exercise activities that are performed by the athletes 102. As used herein, an exercise activity comprises a specific instance of exercise, such as an event, action, or series of actions during which aerobic or anaerobic exercise occurs for the athlete 102. Exercise activities may therefore include a run, a race, a bicycle ride, a lifting routine, a dance practice, swimming at a pool, etc.

The tracking server 110 generates records of the exercise activities for each athlete 102 based on the messaging. In one embodiment, each record describes a specific exercise activity performed by an athlete 102. For each athlete, the tracking server 110 compiles records for the athlete into a fitness history 116 for the athlete. Thus, as used herein, a fitness history 116 comprises a collection of records that indicate exercise activities performed by an athlete 102 over time.

The aggregation server 150 aggregates/acquires a bespoke set of articles for each athlete 102 from news feed providers 122 at a repository 120. The articles for each athlete 102 are selected based on the fitness history 116 of that athlete 102. The aggregation server 150 customizes a news feed for an athlete 102 by populating it with the selected articles. The aggregation server 150 delivers the customized news feed to the athlete 102 via a user device 104 for the athlete 102. In one embodiment, the news feed is provided as a Java Script Object Notation (JSON) response list of articles, images, and Uniform Resource Locators (URLs).

Network architecture 100 provides a technical benefit over prior systems and devices, because it provides a unique arrangement of devices and capabilities that enables the fitness histories of an entire population of athletes to be automatically compiled and analyzed. Furthermore, this unique arrangement of devices enables relevant pieces of content to be selected and delivered to a population of athletes in a manner that is personalized for each and every athlete.

In the embodiment depicted in FIG. 1, users 106 of the network architecture 100, and/or user devices 104 generate metrics that describe exercise activities performed by a corresponding athlete 102. In one embodiment, each athlete 102 is also a user 106 for their own account at tracking server 110. However, in some instances the users 106 include support personnel (e.g., coaches, trainers, physical therapists, nutritionists, etc.) for an athlete 102. Thus, the term "user" is not necessarily synonymous with the term "athlete" as used herein. In many embodiments, for each user 106, there is a single associated athlete 102. However, in further embodiments, a user 106 represents an organization such as a gym, team, or club that includes multiple athletes 102. In such instances, the organization may report on behalf of each of the athletes 102 in the organization.

The metrics describe exercise activities performed by athletes 102, by providing indications of the type and/or intensity of exercise being performed over time. In one embodiment, the metrics are manually generated by users 106 based on typed or templated input (e.g., fillable forms). In a further embodiment, the metrics are automatically generated by user devices 104 or a third party server 160 during or after an exercise activity. In one embodiment, metrics for exercise activities performed by athletes 102 are transmitted to tracking server 110 by the user devices 104 or a third party server 160. The metrics may be provided over time on an ongoing or periodic basis as desired (e.g., in real time via push/pull notifications, at scheduled intervals such as once per day, once per week, etc.).

Each exercise activity may be described using a variety of different metrics, and these metrics include both raw measurements to processed statistics. Raw measurements may include data such as step tracking data, heart rate data, pulse data, audio data, glucose data from a continuous glucose sensor, sleep tracking data, accelerometer data, data from a Global Positioning System (GPS), elevation data, etc. Processed statistics are data that has been generated based on an analysis of raw measurements. Processed statistics may include a number of steps taken based on an analysis of raw accelerometer data, a speed based on GPS data over time, etc.

Depending on embodiment and the capabilities of a user device 104 used by the athlete 102, processed statistics may be generated at the user device 104 and provided to the tracking server 110. Additionally or alternatively, a controller 112 of the tracking server 110 may process raw measurements in order to generate processed statistics. In a further embodiment, exercise activities are dynamically determined by user devices 104. The user devices 104 generate records of exercise activities, and/or entire fitness histories 116 based on the metrics discussed herein, and transmit this information to tracking server 110 for analysis and storage.

Metrics may also include information that is not easily categorized as either a raw measurement or a processed statistic. In one embodiment, metrics for exercise activities include scheduled event titles and/or dates listed on a calendar, a textual workout history or journal, reported event attendance, a dietary log, and/or a wellness log.

The start or end of an exercise activity may be indicated based on manual input (e.g., a button press at a user device 104), may be determined dynamically based on metrics in the form of accelerometer data (e.g., indicating that a run or ride is presently occurring), may be determined based on information in a calendar, or via other means.

Exercise activities for organizational users may indicate events that are hosted by the organization and are attended by multiple athletes. Metrics for an exercise activity of an organizational user may therefore describe an activity performed by multiple athletes at the same time (e.g., an exercise class or group race hosted by the organization, etc.).

In order to facilitate the generation and processing of metrics for exercise activities, each exercise activity (i.e., each recorded instance of exercise) is classified based on the type of exercise being performed. A type may refer to a kind of action performed, such as cycling, skiing, running, swimming, etc. In a further embodiment, types exist for indoor exercise and for outdoor exercise. Types may overlap each other, and/or contain other types. Furthermore, each exercise activity may be associated with one or more types. Each type is associated with one or more classes of articles, such that a type for cycling may be associated with articles describing gear and training for bicycles, while a type for swimming may be associated with articles describing gear such as goggles and recent swimming competitions.

Tracking server 110 is capable of receiving various metrics, records, reading histories, and/or fitness histories 116 discussed above via interface 113. Controller 112 builds records of exercise activities for individual athletes from received metrics. These records are compiled into fitness histories 116 for each of the athletes 102, which are stored in memory 114 (e.g., a hard disk, Random Access Memory (RAM), etc.). In embodiments where a user device 104 generates its own record of an exercise activity, controller 112 stores the record in memory 114 within a fitness history 116 that corresponds with an athlete 102 associated with that user device 104.

In addition to fitness histories 116, tracking server 110 also stores profiles 115 for the athletes 102 in memory 114. These profiles 115 may be maintained and updated by users 106 over time. In one embodiment, the profiles 115 recite billing information, a delivery address pertaining to the athlete 102 (e.g., billing information for charging the athlete, or an associated sponsor or organization), and/or athletic goods (e.g., athletic equipment, nutritional supplies, etc.) owned and/or operated by the athlete 102. The controller 112 may also review indications of purchases 119 made by or on behalf of the athlete 102 over time from the user devices 104 or via third party sources such as third party server 160 (e.g., directly from distributors of athletic equipment, via cookies on Internet browsers, etc.).

In many embodiments, profiles 115 each further include a reading history. A reading history may indicate a number of fitness-related articles read (and/or videos watched) by the athlete 102, a type of exercise associated with each article, the publication that sourced each article, a number of minutes spent reading articles for each type of exercise, etc. Depending on embodiment, the reading history may be received from or provided to a third-party content distributor, or provided directly via input from a user device 104. In one embodiment, the reading history is actively tracked via news feed providers 122, repository 120, a third party server 160, and/or a user device 104. Such tracking may be based on interactions with a provided news feed, based on cookies stored at Internet browsers, etc.

Subscriptions 118 stored in memory 114 indicate what publications and/or websites the athlete 102 is subscribed to. Controller 112 may also store demographics 117 for each athlete 102 in memory 114.

The fitness histories 116 for the athletes are used to determine categories of engagement of the athletes 102. For example, by reviewing information describing each of the exercise activities in the fitness history 116 across a static or moving window retrospective review period (e.g., the last week, last month, etc.), the controller 112 may determine current categories of engagement for each of the athletes. In one embodiment, prospective information is also utilized to determine current categories of engagement. For example, controller 112 may acquire events from a calendar for exercise activities of an athlete 102. Based on the names and times of scheduled events in the future (e.g., in the next month or week, or other predefined period), additional categories of engagement for the athlete 102 may be determined by controller 112.

As used herein, a category of engagement is a form of athleticism that an athlete partakes in. In one embodiment, categories of engagement correspond with types of exercise. In further embodiments, a category of engagement may be accompanied criteria such as an intensity level, experience level, type of weather, and/or other information. In embodiments where a fitness history 116 is considered over a review period (e.g., the last week or last month), categories of engagement may be determined based on the types of exercise engaged in by the athlete 102 during the review period. In one example, the categories of engagement for an athlete include each type of exercise indicated in records of a fitness history 116 of the athlete 102 during the review period. In another example, if a fitness history 116 reports that an athlete 102 has engaged in a type of exercise for a threshold number of times or amount of time within the review period, it is listed as a category of engagement.

In a further example, all types of exercise performed by an athlete 102 within a first review (e.g., the last month) are added as categories of engagement, while types of exercise performed by an athlete within a second review (e.g., the last year) are selectively added as categories of engagement (e.g., based on the number of times, and or amount of time, spent performing those types of exercise during the second review period). In yet another example, the review period may be of any duration, or even infinite. However, records that are further in the past are associated with a time decay function such that their influence is less notable than more recent records.

In yet further embodiments, each category of engagement is assigned a weight based on the number of times and/or amount of time that the corresponding type of exercise was engaged in by the athlete 102 within a review period. Articles may then be selected for a news feed for the athlete such that the proportion of articles corresponding with each category of engagement is proportional to the weight of that category of engagement with respect to other categories of engagement for the athlete 102. In one implementation, categories of engagement for types of exercise which are performed less often are weighted more heavily. This increases the weight of "outlier" activities that are not routinely performed by the athlete 102. Hence, the athlete 102 is more likely to be presented with articles for a variety of categories. Such presentation may encourage the athlete 102 to learn more about types of exercise that they have recently been exposed to.

In some implementations, the engagement of an athlete with certain combinations of categories of engagement may indicate participation in a new category of engagement. For example, if an athlete 102 engages in running, swimming, and cycling, the athlete 102 may be flagged as engaging in cross-training.

The thresholds discussed herein for determining categories of engagement may also or alternatively be based on a number of miles traveled, number of calories consumed, or other information such as a reading history. For example, if a fitness history 116 for an athlete 102 indicates that, for a specific type of exercise, a threshold number of miles have been traveled, activities have been attended, calories have been consumed, or time has been spent at a desired heart rate, then a category of engagement may be assigned to the athlete 102, and/or associated with a specific intensity level or experience level. Similar operations may be performed if a threshold achievement is reached. Such achievements may include attendance of the athlete 102 at a specific competition (e.g., the Boston marathon), a threshold amount of distance traveled by the athlete 102 during a single exercise activity at a threshold pace (e.g., twenty-six miles at a pace of under three hours), etc. In one embodiment, the controller 112 utilizes this data to detect a transformation of an athlete from one experience level to the next for a given type of exercise activity.

In still further embodiments, additional data may be used to determine further categories of engagement. For example, additional categories of engagement may be determined based on the classes of articles that are most likely to be read (or have already been read) by a user 106, based on a history of clicks of the user 106 at a user device 104. Furthermore, demographics may be considered in order to determine, or exclude, certain categories of engagement.

Categories of engagement may be provided from interface 113 of the tracking server 110 to an interface 154 of the aggregation server 150. Interface 154, and/or interface 113, may comprise an Ethernet interface, wireless interface, etc. On a periodic basis (e.g., daily, weekly, etc.), ongoing basis (e.g., via a moving window analysis in real-time), and/or on request (e.g. in response to push/pull notifications), a controller 152 of the aggregation server 150 analyzes the categories of engagement for the athletes 102.

In FIG. 2, the controller 152 of the aggregation server 150 selects articles from a repository 120 based on the categories of engagement of the athletes. In one embodiment, the controller 152 consults prioritization directives 158 when selecting the articles. Prioritization directives 158 indicate a preference for article selection, such as a preference based on price, source, authorship, or other factors. In one embodiment, the prioritization directives include cost functions which each are defined as a weighted combination of preferences for article selection. The prioritization directives 158 may be applied globally to all athletes 102, may be applied to a sub-population of the athletes 102, or may be associated with specific athletes 102. In this manner, aggregation server 150 may use the prioritization directives 158 to acquire articles from the repository that are inexpensive, to promote certain publications, or to promote specific authors across a variety of brands.

In this embodiment, repository 120 comprises a combination of news feed providers 122, which are implemented as one or more network-accessible servers that host articles associated with specific categories of engagement. In this embodiment, the news feed providers 122 are each dedicated to different categories of engagement, intensity level, and/or experience level. The news feed providers 122 may be associated with different brands and/or companies. In further embodiments, the articles at each news feed provider 122 are given specific prices, associated with specific authors or publications, etc.

Upon acquiring articles from the repository 120 for an athlete 102, the aggregation server 150 arranges the articles into place within a news feed for the athlete. In one embodiment, the news feed comprises a scrollable list of articles. In a further embodiment, aggregation server 150 acquires advertising media from advertising server 140, and integrates the advertising media into the news feed, for example as part of a "magic carpet," banner, or similar form of advertisement.

The news feed for each athlete 102 is then transmitted to user devices 104 via network 130. At this point, athletes 102, and/or users 106 may view the news feed via user device 104 in order to stay informed of current events, training opportunities, or other information that is personally relevant to the athletes 102.

The number of articles acquired by the aggregation server 150 from the repository 120, and placed into the news feed, may vary as a matter of design choice. In one embodiment, the number of articles is predetermined. In another embodiment, the number of articles is based on the expected number of articles that the user 106 will read in a single session, based on historic data indicating an average number of articles read by that user 106 per session.

In a further embodiment, the aggregation server 150 triggers article retrieval in response to a user 106 requesting the news feed. The aggregation server 150 then acquires a number of articles for the news feed. In response to the user device 104 reporting that the user 106 has scrolled past a threshold number of articles, the aggregation server 150 retrieves additional articles to continue extending the news feed. Thus, from the perspective of the user 106, the news feed appears to be infinite.

The various servers described with regard to FIGS. 1-2 may each comprise a single physical computer or cluster of computers. In further embodiments, the operations of any of various servers discussed herein may be implemented at other servers or devices discussed herein. Any of the various servers and electronic devices discussed herein may include one or more controllers and memories similar to those described for tracking server 110 and/or aggregation server 150. In one embodiment, controller 112 and/or controller 152 are implemented as custom circuitry, as a hardware processor executing programmed instructions stored in memory, or some combination thereof. Memory 114, memory 156, and/or any other of the memories discussed herein, may be implemented as a computer readable medium such as a flash memory, hard disk, Random Access Memory (RAM), optical media, or other electronic storage device.

All of the operations discussed above may be performed by tracking server 110 and/or aggregation server 150 on a periodic or ongoing basis, such as in real-time, for millions of athletes 102. Furthermore, each athlete 102 may engage in and report metrics for thousands of exercise activities per year. This results in the tracking server 110 and aggregation server 150 receiving millions of updates in short periods of time (e.g., per hour) and generating notable amounts of additional records and news feeds. The scope and scale of these operations mean that they cannot be performed by hand or as a mental process. This insight regarding ongoing tracking of exercise activities is true even when the population of athletes comprises hundreds or thousands of individuals.

Illustrative details of the operation of network architecture 100 will be discussed with regard to FIG. 3. Assume, for this embodiment, that repository 120 has been populated with articles pertaining to a variety of categories of engagement, and that athletes 102 are engaged in a series of exercise activities over a period of time. Furthermore, assume that users 106 and/or user devices 104 are generating messaging on an ongoing basis describing these exercise activities. The messaging may comprise a customized format that is compatible with an Application Programming Interface (API) supported by the tracking server 110. In this embodiment, each user device 104 and/or user 106 utilizes a unique identifier, password, and/or token to indicate, authenticate, and/or authorize the athlete associated with each exercise activity. Tracking server 110 and/or aggregation server 150 therefore refuse communications that have not been authenticated and authorized.

Figure 3:
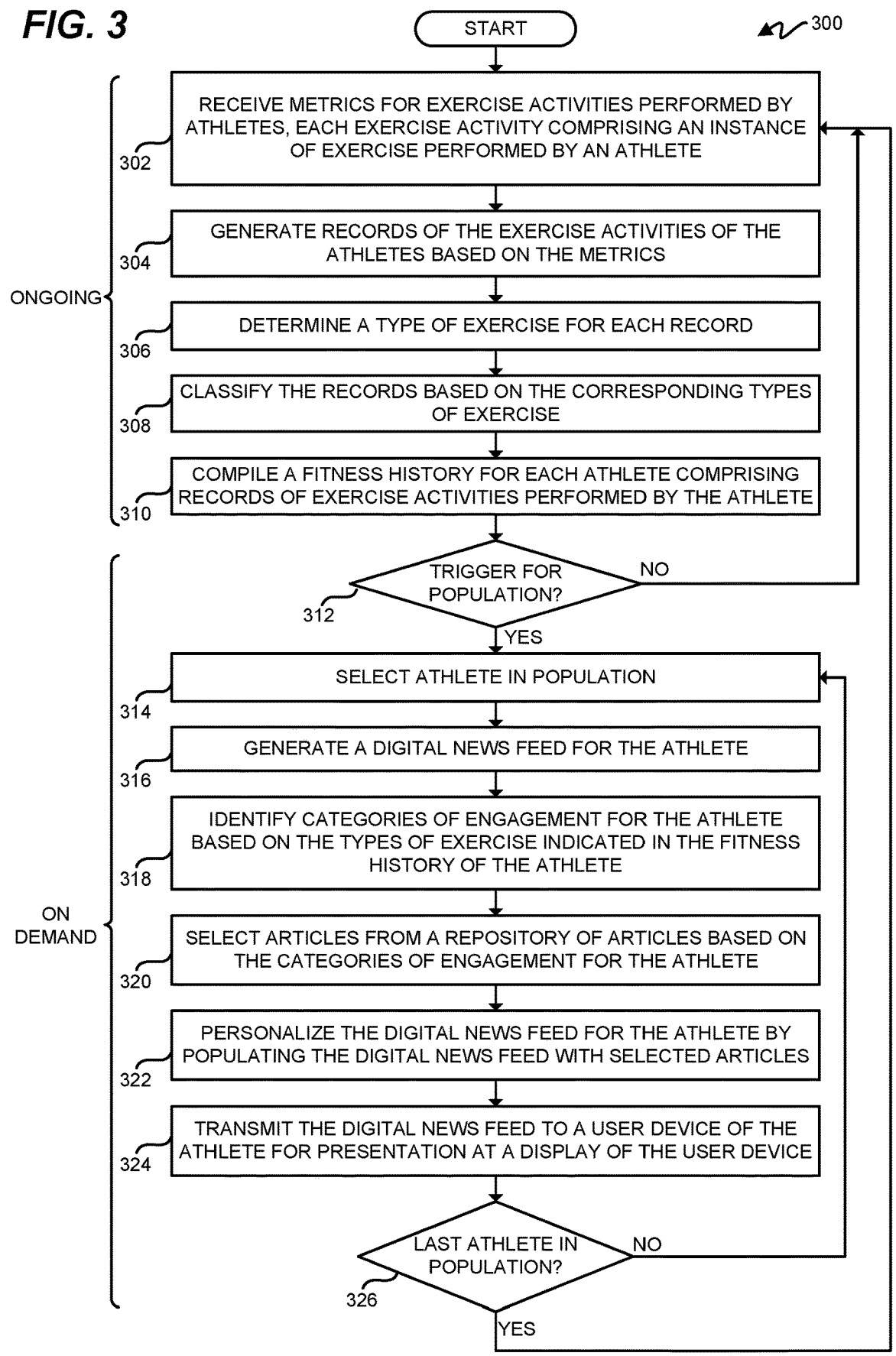
FIG. 3 is a flowchart depicting a method of operating the network architecture of FIG. 1 in an illustrative embodiment.

FIG. 3 is a flowchart depicting a method 300 of operating the network architecture 100 of FIG. 1 to generate news feeds that are each personalized based on the exercise activity of a specific athlete in an illustrative embodiment. The steps of method 300 are described with reference to network architecture 100 of FIG. 1, but those skilled in the art will appreciate that method 300 may be performed in other systems. The steps of the flowcharts described herein are not all inclusive and may include other steps.

Steps 302-310 pertain to an ongoing process of generating and maintaining fitness histories 116 for athletes, based on received metrics for exercise activities. Step 302 of method 300 includes interface 113 of tracking server 110 receiving metrics for exercise activities performed by athletes 102. Each exercise activity comprises an instance of exercise performed by an athlete 102. In one embodiment, the metrics are received from user devices 104 and/or third party server 160 as messaging via network 130. The metrics may comprise raw measurements, processed statistics, or other information as discussed above. In this embodiment, the metrics are provided in an encrypted and/or compressed file format.

In step 304 the controller 112 of the tracking server 110 generates records of the exercise activities of the athletes based on the metrics. Each record comprises a summary of an exercise activity. These summaries may be dynamically determined by controller 112 based on an analysis of the metrics as discussed below, or may be guided by user input. In one embodiment, each of the records is generated in a normalized file format, which provides a technical benefit by facilitating retrieval and/or analysis of large groups of records. In further embodiments, each of the records comprises a summary of an exercise activity, and is stored separately from the metrics. In yet another embodiment, the metrics for an exercise activity are discarded after a corresponding record has been generated.

In step 306, the controller 112 determines a type of exercise for each record. In one embodiment, the determination of type is performed by analyzing the metrics of the record, as discussed above. In a further embodiment, the determination of type is based on calendar information, information provided by a user 106, or other sources.

In step 308, the controller 112 classifies the records based on corresponding types of exercise. In one embodiment, this comprises applying a label to each record indicating the type(s) of associated exercise that was performed. In a further embodiment, this comprises sorting and/or indexing the records based on the associated types of exercise.

In step 310, the controller 112 compiles a fitness history 116 for each athlete. Each fitness history 116 comprises records of exercise activities performed by a specific athlete 102 over time. In one embodiment, the fitness history 116 comprises a database of records that each pertain to the same athlete 102. In one embodiment, compiling the fitness history 116 of an athlete comprises grouping the records for an athlete via indexing in a database, or placement of records in a common location within a file system at the tracking server 110.

Steps 302-310 may be performed continuously and/or periodically as desired, and may be performed in parallel and/or asynchronously for many athletes 102 at once. At some point in time, a triggering event occurs which indicates that customized news feeds for a population of one or more athletes are desired.

Steps 312-326 describe processes for generating news feeds on demand for populations of athletes, based on the detection of triggering events. In step 312, controller 152 of aggregation server 150 determines whether a triggering event has occurred, such as a request from an athlete 102 or user 106 for a news feed. In one embodiment, a triggering event comprises the conclusion of a period of time. However, any other suitable condition may be utilized to trigger news feed generation. Different triggers may be associated with different populations of athletes 102. For example, a request from a specific athlete 102 may be associated with a population consisting of that athlete alone, while the end of a time period (e.g., the end of a day) may be associated with a large population of athletes 102.

In step 314, an athlete 102 from the population is selected. In embodiments where news feeds are generated in response to a request from an athlete 102, then that athlete is selected. In embodiments where a batch of news feeds are generated by aggregation server 150 for multiple athletes at once, any suitable criteria for selection may be used (e.g., alphabetical, numerical, etc.).

In step 316, controller 152 generates a digital news feed for the athlete 102. In one embodiment, the digital news feed comprises a generic or default news feed, which includes a variety of articles pre-selected by the controller 152. In another embodiment, the digital news feed comprises an empty data structure waiting to be populated with articles. Controller 152 may format the digital news feed based on the user devices 104 that are used by the selected athlete 102. For example, if a user device 104 for the selected athlete 102 is a tablet, then the controller 152 may generate the digital news feed in a mobile-compatible format (e.g., a format tailored for the Android or iPhone Operating System (OS)). Alternatively, if the user device 104 is a desktop computer, the controller 152 may generate the digital news feed in a format tailored for a desktop browser.

Method 300 further includes step 318 of identifying categories of engagement for the athlete 102. In one embodiment, this comprises aggregation server 150 requesting categories of engagement for the selected athlete 102 from tracking server 110. In a further embodiment, this comprises aggregation server 150 requesting fitness histories 116 from the tracking server 110, and actively analyzing the fitness histories 116 to determine categories of engagement.

Step 320 includes selecting articles from a repository 120 of articles based on the categories of engagement for the athlete 102. In one embodiment, for each of the athletes 102, selecting articles from the repository 120 for each of the athletes is also based on an intensity level and/or experience level associated with a category of engagement of that athlete. This selection process may be performed by selecting from articles in the repository 120 that are tagged with the category of engagement, and/or any associated intensity levels, experience levels, terrain types, and/or types of weather. In a further embodiment, step 320 includes controller 152 analyzing a profile for the athlete 102 to determine subscriptions of the athlete 102. The controller 152 then queries the news feed providers 122 associated with the subscriptions of the athlete 102. For example, in one embodiment each news feed provider 122 provides articles from a brand, and subscriptions of the athlete 102 are listed on a brand by brand basis. Controller 152 then selects articles from brands that the athlete 102 is subscribed to.

Step 322 includes controller 152 personalizing a digital news feed for the athlete, by populating the digital news feed with the selected articles. In one embodiment, the controller 152 of the aggregation server 150 arranges the articles (or links to the articles) into the news feed. The news feed may comprise a customized news feed format, data encoded according to a streaming format, a web page, or other form of presentation. The controller 152 may further define an order of presentation of the articles on the news feed for the athlete 102 based on the fitness history of that athlete 102. In one embodiment, each category of engagement is weighted based on an amount of time spent by the athlete on a corresponding type of exercise. Articles that correspond with more highly weighted categories are then arranged closer to the top of the news feed than articles that correspond with categories having lower weights. The order of the articles may be further influenced based on recency, prioritization directives, or other factors.

Method 300 further includes aggregation server 150 transmitting the digital news feed to a user device 104 of the athlete for presentation at a display of the user device 104, in step 324. In one embodiment, this comprises controller 152 instructing interface 154 to transmit data for the news feed via network 130 to a user device 104 that is associated with the athlete 102. In further embodiments, the data for the news feed is transmitted from the aggregation server 150 to the user device 104 via a third party server 160, which modifies and/or forwards the news feed to the user device 104. In such an embodiment, the third party server 160 may request a personalized news feed on behalf of an athlete 102, and then provide the news feed to a user device 104 in a format that is specific to the third party. This enables the aggregation server 150 to perform news feed generation for third parties that lack the ability to review the fitness histories 116 of athletes 102.

If a digital news feed has been transmitted to the last athlete in the population in step 326, then processing returns to step 302. Alternatively, if another athlete in the population 102 has not yet received a customized news feed, processing proceeds to step 314. In embodiments where digital news feeds are generated in response to individual requests, step 326 is bypassed.

In a further embodiment, controller 112 of tracking server 110 dynamically alters/updates categories of engagement for the athletes based on updated fitness histories that report new exercise activities. Based on these altered categories of engagement, controller 152 of aggregation server 150 proceeds to select, on an ongoing basis, new articles from the repository based on the altered categories. The controller 152 further populates news feeds for athletes with the selected new articles, and provides instructions for transmitting the news feeds for display at user devices of the athletes.

While method 300 is described as an iterative process that proceeds incrementally across athletes 102, the various steps described herein may be performed in parallel and/or asynchronously for multiple athletes 102 at once. Furthermore method 300 may be performed parallel and/or asynchronously in response to user requests for news feeds. In further embodiments, large batches of athletes are processed at a time, such that a first portion of a population of athletes receives updated news feeds, then a second portion of the population receives updated news feeds, etc.

Figure 4:
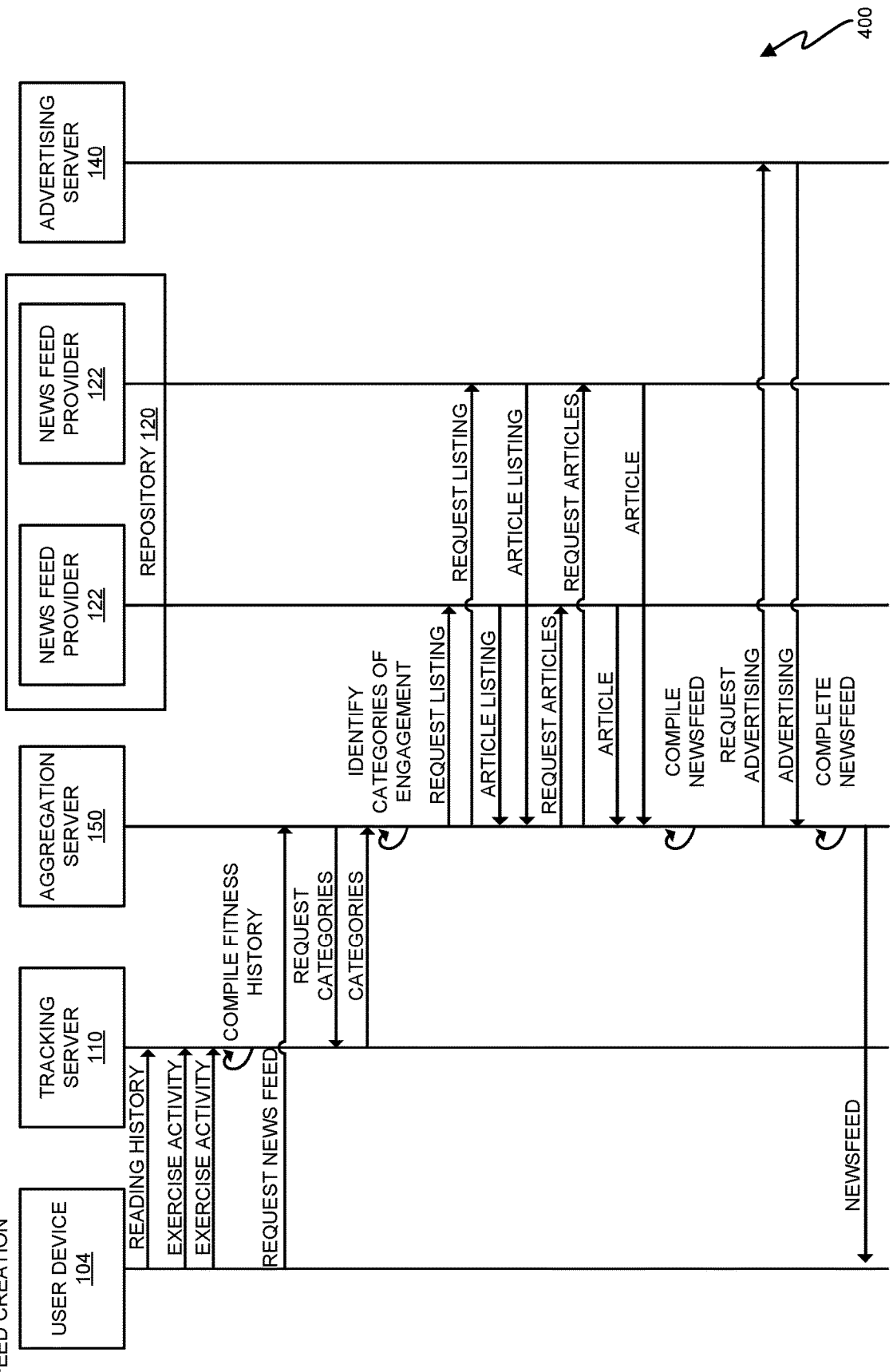
FIG. 4 is a message diagram illustrating a messaging flow between components of the network architecture of FIG. 1 in an illustrative embodiment.

FIG. 4 is a message diagram 400 illustrating a messaging flow between components of the network architecture of FIG. 1 in an illustrative embodiment. Specifically, message diagram 400 depicts generation of a news feed for a single athlete 102, based on reported exercise activities. In FIG. 4, a reading history and exercise activities for an athlete 102 are reported from a user device 104 to a tracking server 110. The tracking server 110 adds records of the exercise activities to a fitness history 116 for the athlete 102, and stores the received reading history in memory. This information is utilized to determine categories of engagement of the athlete 102. At some point in time, a user 106 for an account of the athlete 102 requests that the aggregation server 150 provide a news feed for viewing. The aggregation server 150 then requests a list of categories of engagement for the athlete 102. The categories of engagement are then provided to the aggregation server 150. The aggregation server 150 identifies the categories of engagement for the athlete 102. The aggregation server 150 then requests articles from repository 120 that are associated with the categories of engagement for the athlete 102. Based on these requests, news feed providers 122 (e.g., publications) provide articles to the aggregation server 150. In this embodiment, the aggregation server 150 compiles the articles into a personalized news feed, and then requests advertising media from an advertising server 140. The completed news feed, together with the advertising media, is then transmitted from the aggregation server 150 to the user device 104 for consumption by athlete 102 and/or user 106.

Input Sources and Processing

With a discussion provided above of the general flow and processing of data pertaining to exercise activities for athletes, and the generation of news feeds based thereon, the following section focuses upon a variety of sources of input for tracking server 110, as well as techniques for processing that input to generate standardized records of exercise activities.

Figure 5:
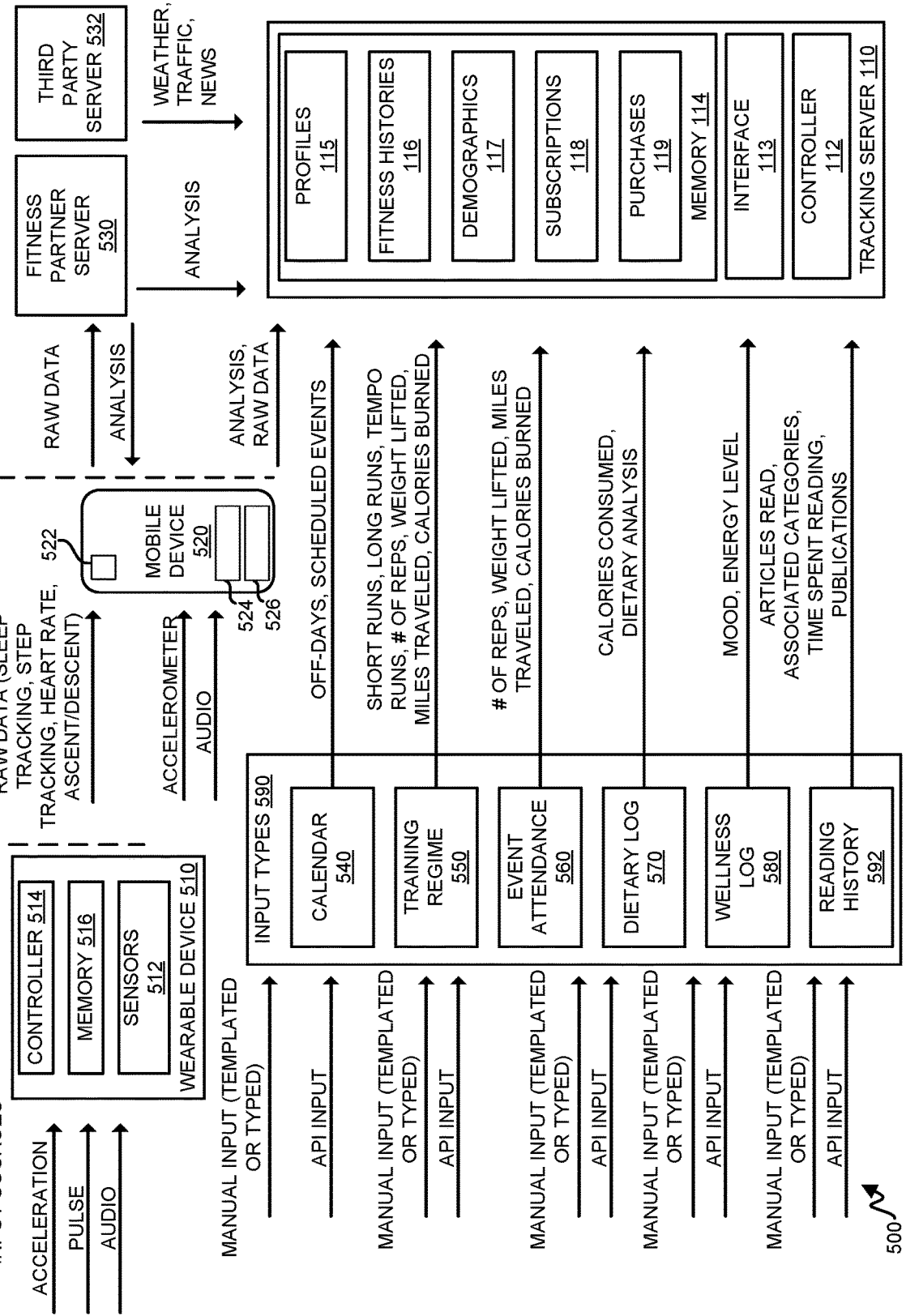
FIG. 5 depicts input sources for a tracking server in an illustrative embodiment.

FIG. 5 depicts input sources 500 for a tracking server 110 in an illustrative embodiment. Such input sources may comprise user devices 104, other athletic accessories for an athlete 102, one or more third party servers 160, etc. In this embodiment, input sources 500 include a wearable device 510 (e.g., a user device 104 such as a smart watch or band), which records measurements for an athlete 102 in real-time during an exercise activity. While only one wearable device 510 is depicted, in practice millions of athletes 102 may utilize millions of wearable devices 510 to record and report metrics to a tracking server 110 on an ongoing basis and/or in real-time. These metrics may include acceleration data, pulse data, audio information, and other content. The wearable device 510 includes sensors 512 (e.g., accelerometers, microphones, pulse oximeters, a glucose monitor, a camera, etc.), a controller 514, and a memory 516. In one embodiment, controller 514 analyzes input from the sensors 512 to generate new metrics that describe the current exercise activity. For example, controller 514 may analyze raw pulse oximetry readings to determine a pulse rate, may track acceleration to determine pedometry metrics (e.g., steps taken) or total distance traveled, may review audio data to determine breathing rate and depth, etc. Metrics from wearable device 510 may be provided directly to tracking server 110 via network 130, or may be provided to an intermediary mobile device 520 or home computer for processing prior to transmission to the tracking server 110.

Mobile device 520 (e.g., a cellular phone, tablet, etc.) includes an antenna 522 that is adapted to communicate with a wireless and/or cellular network, and further includes a controller 524 and memory 526. In one embodiment, mobile device 520 acquires metrics from a wearable device 510, and processes the metrics to generate a fitness history that includes a series of exercise activities. In a further embodiment, controller 524 acquires measurements (e.g., raw sensor data) from the wearable device 510 and/or sensors at the mobile device 520, and processes the measurements to generate metrics in a similar manner to the controller 514 of wearable device 510. These metrics are stored in memory 526. In further embodiments the mobile device 520 forwards raw or formatted data onward to a fitness partner server 530, such as a server operated by a provider of a fitness, wellness, or dietary application stored on the mobile device 520. The fitness partner server 530 further analyzes the metrics to further characterize exercise activities performed by the athlete 102.

The wearable device 510, mobile device 520, and/or fitness partner server 530 provide metrics to tracking server 110. These metrics, which may include raw measurements and/or processed statistics, form the basis of a fitness history 116 for an athlete 102. In some embodiments, the metrics provided to the tracking server 110 explicitly recite each exercise activity included the fitness history 116, while in further embodiments, the tracking server 110 utilizes controller 112 to determine the nature of exercise activities in an athlete's fitness history 116 (e.g., by analyzing the metrics or other data associated with the exercise activity). The fitness history 116 may also include a variety of pieces of information gleaned from manual input, templated typed input (e.g., fillable forms generated for a user), or Application Programming Interface (API) data received at the tracking server 110.

Tracking server 110 may also acquire data from a third party server 532 (e.g., a server operated by a news agency, traffic department, weather agency, etc.) indicating, for example, weather information, traffic information, or news information pertaining to the time and/or location at which exercise activities occur. Controller 112 utilizes this information to apply tags or other descriptors to an exercise activity. For example, if an athlete 102 participates in a distance run on July seventh, and a rainstorm occurred at the location of the run on that date, then the controller 112 of the tracking server 110 may determine that the exercise activity occurred in the rain.

FIG. 5 also illustrates a variety of input types 590 that provide information for a fitness history 116. In this embodiment, the input types 590 provided for an athlete 102 include events listed on a calendar 540 stored in memory. These events may indicate off-days, scheduled activities, and other information. In one embodiment, the type of exercise activity performed, distance traveled, and/or duration of exercise activity is inferred from events in a calendar 540 based on a title of each event and a duration of each event. For example, a "speed run 5 k" event on a calendar 540 may be categorized by controller 112 as a distance running event covering five kilometers of distance.

Input types 590 further include training regime 550. Training regime 550 may comprise a work out journal indicating the results of prior exercise activities, or a predefined work out schedule indicating the nature of future planned activities. In one embodiment, the training regime includes entries indicating a duration or distance of running activities, a number of repetitions ("reps") of various lifting and/or aerobic activities, and/or a number of calories burned for each exercise activity.

Input types 590 further include a history of event attendance 560. Event attendance 560, for example as indicated by registration records for participation in a race, is analyzed to determine that an athlete 102 has participated or will participate in an event. Parameters determined for the event indicated in the registration records (e.g., a distance, type of exercise activity, or other information) can also be added to the fitness history of a corresponding athlete 102.

Input types 590 also include a dietary log 570 and a wellness log 580. The dietary log 570 includes information indicating calories consumed, types of food eaten, times that food was eaten, and/or similar information. Calories consumed, in combination with weight measurements for an athlete 102, can be utilized by controller 112 to infer an intensity of exercise activities. For example, if an athlete 102 is eating five to ten thousand calories per day and not gaining weight, controller 112 may infer that the activities for the athlete 102 are high-intensity activities.

A further input type provided in FIG. 9 is a reading history 592. In this embodiment, the reading history 592 for an athlete 102 includes identifiers for each article read by the athlete 102 via a user device 104, the time that each article was accessed by the athlete 102 and the time spent reading each article, categories of engagement associated with each article, the publication associated with each article, and other information. The reading history 592 may be utilized by controller 112 of tracking server 110 to determine the current level interest of the athlete 102 with respect to various categories of engagement reported in the fitness history 116 of that athlete 102. Controller 112 may further identify new categories of engagement, or apply weights to existing categories of engagement, based on this reading history 592.

Wellness log 580 may include entries indicating the physical and/or emotional wellness of an athlete 102, such as a mood and/or energy level of an athlete 102. These entries may be reviewed to determine whether an athlete 102 is experiencing issues related to their current exercise activities. By analyzing the date of an injury or pain (e.g., an anatomical location of pain, or descriptor of pain sensation) suffered by athlete 102 and reported in wellness log 580, and comparing this date to dates on which types of exercise were performed, controller 112 may determine that a certain type of exercise is associated with the injury or pain. For example, a specific type of exercise may consistently precede pain by less than a day, indicating that the type of exercise is associated with the pain. Controller 112 may also consider wellness log 580 to determine whether athletic equipment has reached the end of its usable lifetime. For example, if an athlete 102 is complaining of shin splints, controller 152 may determine that the athlete is in need of articles pertaining to injury treatment and/or prevention in the field of running. In a similar fashion, if a cyclist reports that they are feeling groin or back pain, injury treatment and/or prevention articles may be provided in the field of cycling.

The various input types 500 discussed above may be provided in any suitable message format, and may be provided via text messaging or internet traffic according to a variety of specific file formats and standards. The massive amount and variety of information provided to the tracking server 110 may be difficult for a controller 112 to categorize and process if it is provided in a variety of non-uniform formats. Thus, normalization may be utilized to ensure that messaging is consistently formatted when it is provided to a tracking server 110.

In one embodiment, controller 112 tags exercise activities reported by the various input types 500 of FIG. 5. In such an embodiment, the type of exercise activity may be determined in a variety of ways by a controller 112 of the tracking server 110. In one embodiment, the source that provided metrics for the exercise activity is used as an indicator for the type of exercise. For example, metrics from a GPS device provided via a "ski tracking" mode can be assigned to the skiing or snowsports type. In further embodiments, the type of activity is determined based on manual input, input provided via a form or app by the user 106, or based on an analysis of metrics provided for the exercise activity. For example, accelerometer data exhibits different patterns of motion when running than while cycling, and hence accelerometer data can be analyzed to tag an exercise activity with a type for running or cycling. In further embodiments, an activity is tagged based on a location where the activity took place (e.g., at a specific type of gym or park), or on an event indicated in a calendar for the athlete 102. Exercise activities may be further manually tagged by the user 106, categorized based on rules defined by a user 106, categorized by a user device 104, or categorized by a tracking server 110 that acquires metrics therefrom.

Still further types of data, and/or combinations thereof, such as GPS data, map data, satellite imagery other remotely sensed imagery, gyroscopic data and/or accelerometer data, and/or United States Geological Survey (USGS) Earth Resources Observation and Science (EROS) data, may be considered when detecting and documenting exercise activities at controller 112 or a user device 104. For example, map data that is missing for a period of time may be backfilled with GPS data or USGS EROS data to determine amounts of elevation change or distance traveled. In a further example, additional types of data may include additional contextual information describing an activity. For example, if a running activity is performed along a trail, and remotely sensed imagery for the day indicates that the trail is bright white (i.e., has a greater than threshold albedo), and weather information indicates that the temperature is below a threshold (e.g., forty degrees), the remotely sensed imagery may be utilized to infer the presence of snow. In yet another example, a combination of the data types above may be considered in combination to determine a type of activity, and/or the equipment being used for the activity. In this manner, speed, elevation change, and/or terrain type may influence a determination made by controller 112 (or a user device 104) of whether or not a bicycle is being used, as well as what type of bicycle is being used (e.g., a mountain bike versus a road bike).

In one embodiment, multiple tiers of types are implemented at different levels of granularity. For example, a type for "cyclocross race" be associated with much more narrow set of articles than the type of "cycling" (e.g., any bicycle), because the type of "cyclocross race" is a sub-type (and hence contained within) the "cycling" type.

Exercise activities may further be assigned metrics indicating a date, time, and/or duration of the activity, a location or set of locations at which the activity occurred, a total distance traveled, a total elevation change (upward and/or downward), an average pulse rate, an intensity of activity, etc. Furthermore, each of these metrics may be provided as an average or total for the activity, or as a running count or amount aggregated over a period of time. For example, step tracking information for an exercise activity may indicate the total number of steps traveled, and/or the time that each step was taken.

Metrics for exercise activities may further indicate a latitude and/or longitude, in the form of a start and/or finish position, and/or as a series of locational coordinates provided over time. In further embodiments, data for exercise activities includes one or more images acquired during the exercise activity. By analyzing these images for certain color tones or patterns (e.g., via operation of a trained neural network), a controller at the user device 104 or at the tracking server 110 may assign a terrain type to the exercise activity. Alternatively, terrain type may be explicitly indicated for an exercise activity, or may be inferred based on locations of the athlete 102 during the exercise activity, wherein each of multiple locations is categorized to include one or more terrain types. In still further embodiments, a terrain type, type of exercise activity, breathing rate, and/or other metrics are determined based on sound input acquired during the exercise activity by the user device 104. For example, sound input where a user repeatedly counts to a number may indicate interval training, Tabata training, or a lifting routine, while the sound of repeated footfalls or turning pedals may be analyzed to detect a running or cycling activity.

In a further embodiment, metrics indicating ascent and descent, such as accelerometer measurements over time, or location data (e.g., GPS data including elevation data) over time is utilized to determine terrain characteristics and/or impact force for steps when running. For example, if a percentage of footfalls (e.g., half of footfalls) or number of footfalls in a row (e.g., fifty footfalls) during a run exhibit a threshold difference in height (e.g., of six inches or more, three inches or more, etc., or a corresponding amount of acceleration) from the prior step, then the terrain may be determined to be rough. This may particularly be the case when the net elevation change across the entire exercise activity is less than a threshold amount (e.g., only a few feet or few tens of feet). In addition to reporting metrics for an exercise activity, in one embodiment a user device 104 includes functionality for providing notifications to an athlete 102. In such an embodiment, a user device 104 may acquire information from a third party server, such as a weather service accessible via an Application Programming Interface (API), prior to a scheduled or anticipated athletic event. If the weather information indicates inclement weather in the form of precipitation or excessive heat, the user device 104 generates a notification for the athlete 102. For example, if weather data indicates temperatures above a threshold level at one or more locations where the exercise activity is going to take place, the user device 104 may update its display to indicate a need to pack water, or may send such a notification via SMS to the user 106 or athlete 102. Alternatively, if the user device 104 detects current or expected precipitation during the exercise activity, it may update its display or send an SMS message indicating a need to pack a rain coat or umbrella.

Third party data may also be utilized to validate and/or verify conclusions regarding the type of exercise activity being performed and/or equipment being used. For example, third party data in the form of photographs of an athlete at an event may be analyzed via machine learning techniques (e.g., neural networks, generative adversarial networks, etc.) in order to detect the presence of a specific athlete (e.g., based on a bib number or ID card worn by the athlete as shown in a photograph). Third party data in the form of photographs may also be utilized to determine the prevalence of different types of equipment at an athletic event. This information may then be sold or otherwise provided to manufacturers of equipment to indicate the popularity of different types of equipment.

In further embodiments, notifications may indicate a need for packing nutritional supplies (e.g., energy gel, nutritional bars, electrolyte supplements, etc.) based on weather data, based on an expected intensity of an exercise activities, or based on a type for an exercise activity. For example, certain types of activities (e.g., races, challenges, invitationals, marathons, triathlons, etc.) may be associated with the need for certain supplies, accessories, equipment, or notifications.

In one embodiment, a user device 104 predicts a time at which an athlete 102 will arrive at the finish location of an exercise activity based on current pace data, and predicts weather at the finish location at the predicted time. In yet another embodiment, the user device 104 predicts conditions that will be encountered along a planned route of an exercise activity, such as a cycling trip, and provides dynamic notifications to warn of inclement weather, accidents, and/or road or trail closures. In further embodiments where an athlete has been registered for an event, a data source such as an email, participant registry, or other data source may be reviewed to detect the registration. If anticipated conditions for the event change from an expected level (e.g., based on expected changes in temperature and/or precipitation with respect to prior anticipated conditions), then new equipment suitable for the change in anticipated conditions are provided. For example, if an outdoor running event changes from expected dry weather to expected rain, shoes may be provided with deeper treads, a waterproof layer of clothing may be provided, etc.

Figure 6:
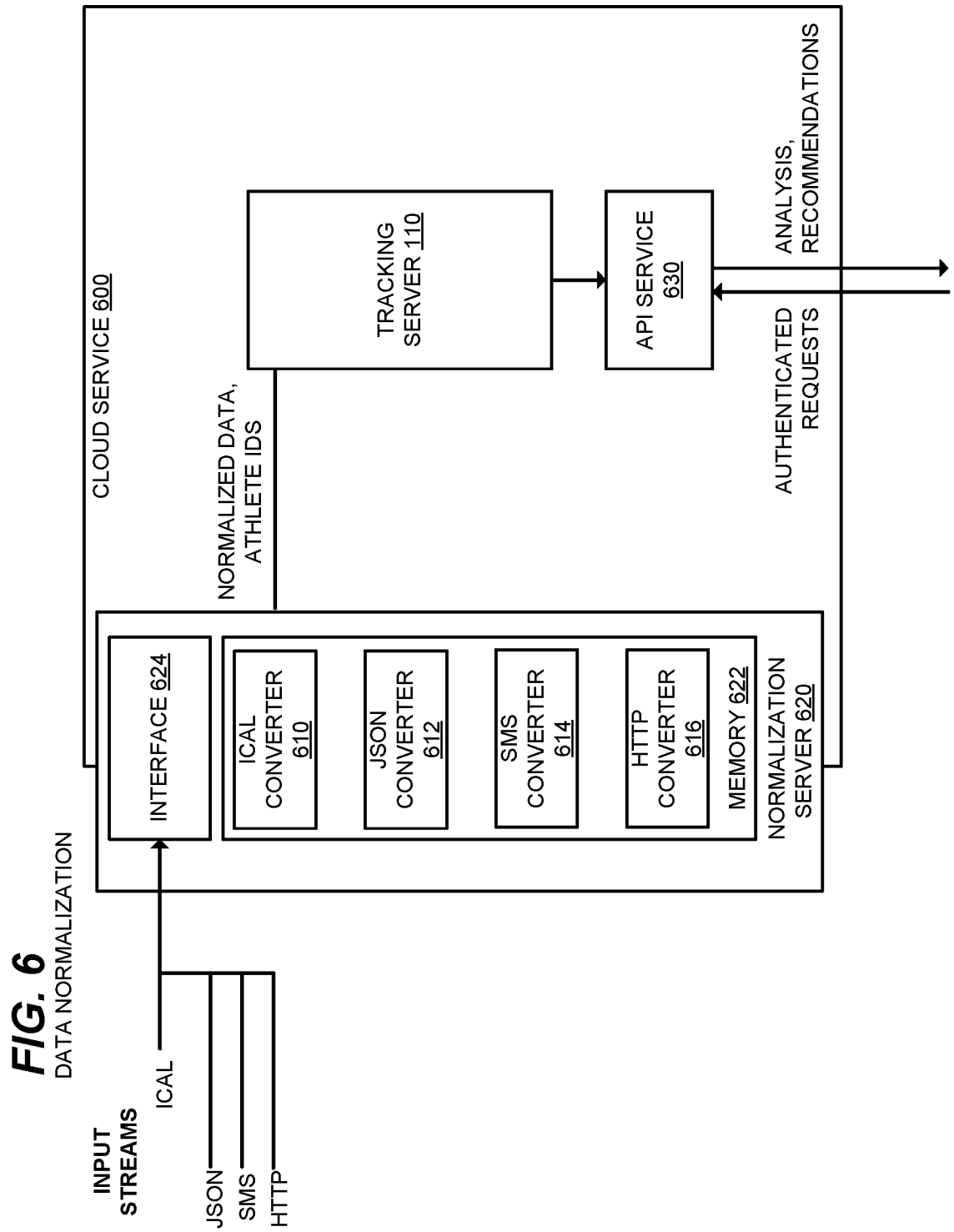
FIG. 6 is a block diagram of a cloud service that utilizes a normalization server to transforms incoming messaging from user devices into a uniform format in an illustrative embodiment.

FIG. 6 is a block diagram of a cloud service 600 that utilizes a normalization server 620 to transform incoming messaging from user devices 104 into a uniform format in an illustrative embodiment. In this embodiment, normalization server 620 reformats data provided in iCalendar (ICAL), JavaScript Object Notation (JSON), Short Messaging Service (SMS), and/or HyperText Transfer Protocol (HTTP) formats, prior to providing the normalized data to a tracking server 110. For example, in one embodiment, a memory 622 of a normalization server 620 includes instructions for converting ICAL data (ICAL converter 610), instructions for converting JSON (JSON converter 612), instructions for converting SMS (SMS converter 614), and instructions for converting HTTP (HTTP converter 616) into a series of standardized records describing exercise activities over time on an activity by activity basis. The instructions for converting each type of input may be performed by identifying tags within the received data, and populating fields of a record for an exercise activity (e.g., title, category, corresponding athlete, etc.) based on those tags.

Normalization server 620 receives non-normalized data at an interface 624 (e.g., an Ethernet or wireless interface), and operates the interface 624 to provide normalized data to a tracking server 110 (e.g., via a network). In this embodiment, tracking server 110 directly handles requests that have already been normalized via an API service 630 supported by the tracking server 110, and provides analysis and recommendations via the API. Because the API service 630 formats received data in an expected format to tracking server 110, normalization of API data is unnecessary.

FIG. 7 is a block diagram 700 depicting a flow of messaging to and from a tracking server 110 in an illustrative embodiment. In this embodiment, data provided to a tracking server 110 comes in the form of push notifications received in real-time, as well as user input provided periodically from users 106 via templated or typed input formats. The tracking server 110 also periodically pulls information pertaining to the fitness histories 116 of athletes 102 on a periodic basis. These inputs may be acquired from fitness partner servers, mobile devices, fitness trackers, etc. A fitness partner comprises an entity that tracks exercise activity data for an athlete on an independent basis. Based on received input, the tracking server 110 may generate real-time analyses of data, periodic analyses of data, and/or scheduled reports for users 106 and/or athletes 102. Examples of such analyses are included in FIG. 7.

Profiles and Records

With a discussion provided above pertaining to input sources and normalization of data, the following section discusses standardized formats for retaining records pertaining to athletes, exercise activities, and athletic equipment.

FIGS. 8-9 depict profiles 800 and 900 of athletes 102 that may be stored at a tracking server 110 in an illustrative embodiment. Profiles 800 and 900, which are examples of profiles 115, are utilized at the tracking server 110 to determine the types of exercise activities that an athlete 102 participates in, the subscriptions that an athlete 102 has with news feed providers, the demographics of the athlete 102, a fitness history of the athlete 102 (e.g., in the form of links or references to records of exercise activities), preferences of the athlete 102, current athletic equipment owned or operated by the athlete 102 (e.g., in the form of links or references to equipment profiles), and/or interests of the athlete 102. Each profile is also associated with an identifier (ID) that uniquely distinguishes the athlete 102 or user 106 from other athletes 102 or users 106. For example, profile 800 indicates that an athlete 102 engages in distance running, cross-fit, and climbing activities, while profile 900 indicates that a different athlete 102 engages in road cycling and climbing. The information in the profiles may be utilized by tracking server 110 to label records for these athletes 102. For example, if a type of an exercise activity reported in a fitness history is uncertain, controller 112 may select from a limited number of types of exercise activities indicated in the profile of the athlete 102 (instead of all possible types of exercise activities). Furthermore, controller 112 may consider the demographics of an athlete 102 when determining an intensity of an exercise activity. For example, a specific heart rate may indicate moderate intensity activity for a younger person, but may indicate high intensity activity for an older person.

FIGS. 10-11 depict records 1000 and 1100 of exercise activities in an illustrative embodiment. Each exercise activity corresponds with one or more specific athletes 102, and corresponds with an actual instance of exercise performed by an athlete 102. Furthermore, each exercise activity is indicated by an event ID that is either unique across all athletes 102 or users 106, or unique to the athlete 102 that the exercise activity relates to. The records 1000 and 1100 also indicate a time or range of time during which the exercise activity took place, metrics for the exercise activity (i.e., measurements and corresponding analysis acquired during the exercise activity and/or pertaining to the exercise activity), and a location history for the exercise activity. The record for an exercise activity also assigns a type to the exercise activity. For example, a bicycle ride on a street may be associated with the type of road cycling, while a vertical ascent of a rock face may be associated with types of climbing and the outdoors. In this embodiment, the type data within each record also indicates an intensity level and an experience level for the associated exercise activity. The intensity level and experience level may be determined automatically by controller 112 as discussed above, or may be manually entered by a user 106 as desired. Each type may be associated with one or more categories of engagement.

In this embodiment, the records 1000 and 1100 also indicate athletic feedback from an athlete 102 after an activity, and an analysis of the metrics for the activity. In one embodiment, the analysis includes suggestions indicating how an exercise activity may be performed more effectively in the future (e.g., by stating "lack of hydration before event" to indicate that more hydration is needed prior to future events), or suggestions indicating that it is time to replace certain pieces of athletic equipment. This analysis may be performed via a natural language analysis or keyword search of athlete feedback. For example, a condition of dehydration during an event may be determined by detecting keywords such as "thirsty," "dry," and "dehydrated" as recited in a predefined list in memory 114.

FIGS. 12-14 depict equipment profiles in an illustrative embodiment. The purpose of an equipment profile is to indicate the current status of athletic equipment owned or operated by an athlete 102. Thus, each equipment profile is associated with an athlete 102 or user 106 indicated in a profile 115. In this embodiment, equipment profile 1200 describes a distance running shoe, equipment profile 1300 describes a road bicycle, and equipment profile 1400 describes a set of road tires. Each instance of athletic equipment is described in an equipment profile with a unique identifier, and each equipment profile also refers to any components of corresponding athletic equipment, and an estimated percentage of lifetime left for that athletic equipment. The type of athletic equipment (e.g., bicycle, shoe, ski, cyclocross helmet) may be indicated in the unique identifier, or may be separately listed in the equipment profile. The type of athletic equipment operated by an athlete 102 may indicate categories of engagement for that athlete 102.

FIG. 15 depicts a listing 1500 of categories of engagement for an athlete 102 in an illustrative embodiment. In this embodiment, each category 1510 of engagement is associated with a sport, an experience level, an intensity level, a weather tolerance, and/or a terrain type. However, in further embodiments, categories 1510 may be associated with other combinations of information, or may exist independently. Each category 1510 of engagement indicates specific types of articles that are preferred by an athlete 102, based on an analysis of the exercise activities of that athlete. For example, the first category 1512 indicates that intermediate level articles about low intensity running, in any type of weather, on paved surfaces or trails, are desired. The second category 1514 indicates that advanced level articles about high intensity cycling in clear weather on paved surfaces are desired. The third category 1516 indicates that expert level articles about high intensity indoor swimming are desired, and the fourth category 1518 indicates that beginner level articles pertaining to high intensity outdoor climbing in clear weather are desired.

FIG. 16 depicts a listing 1600 of articles 1610 in an illustrative embodiment. Each article 1610 is provided an identifier (ID) that uniquely refers to the article at a news feed provider 122, and further includes a title, a source publication, and a sport that the article 1610 describes. Articles 1610 are each also associated with tags. A controller 152 of an aggregation server 150 compares articles 1610 in listing 1600 to categories 1510 of listing 1500 in order to determine whether the articles 1610 are relevant to an athlete 102. For example, a first article 1612 titled "Bouldering Basics" refers to climbing, in the outdoors, at a beginner level. Hence, because it refers to climbing outdoors at the beginner level, and is not associated with a specific type of weather or intensity, it meets criteria listed for the fourth category 1518 of FIG. 15. A second article 1614 pertains to both cycling and triathlon, to gear, and to paved surfaces. Thus, because it matches the cycling sport, does not specify an intensity or experience level, and does not specify a weather type, it falls within the second category 1514. A third article 1616 is associated with running in bad weather, which matches the criteria set down for first category 1512. Finally, a fourth article 1618 does not meet the criteria of any category 1510 of engagement from FIG. 15, because it pertains to cycling in bad weather, and the only category pertaining to cycling for the athlete 102 is restricted to clear weather.

FIG. 17 depicts a listing 1700 of advertisements 1710 in an illustrative embodiment. The advertisements 1710, like the categories of FIG. 15, are associated with specific sports, experience levels, and weather tolerances. These advertisements 1710 include a first advertisement 1712 for a trail shoe, a second advertisement 1714 for a fleece, and a third advertisement 1716 for a set of classes on freeclimbing. Each advertisement 1710 may be associated with a specific sport, experience level, weather tolerance, and/or terrain type. If an advertisement 1710 meets the criteria listed in a category of engagement for an athlete 102, that advertisement 1710 may be suitable for placement in a news feed of the athlete 102. In the event that multiple advertisements are suitable, a controller 152 at the aggregation server 150 may select an advertisement based on price or other criteria.

FIG. 18 depicts a listing 1800 of prioritization directives 1810 that indicate types of articles to be emphasized in a news feed in an illustrative embodiment. Prioritization directives 1810 enable specific types of content to be promoted or emphasized across populations of athletes 102, or for specific athletes 102. In this embodiment, prioritization directives 1810 provide an avenue for promoting specific publications in order to enhance the awareness of athletes with regard to those publications. In this embodiment, athletes that are associated with specific sports, experience levels, intensity levels, and/or demographics have articles from different publications prioritized for them. Specifically, prioritization directive 1812 indicates that articles from women's running should be provided to female athletes engaged in the sport of running, and prioritization directive 1814 indicates that articles from triathlete should be provided to athletes engaged in the sport of triathlon at a high level of intensity. Furthermore, prioritization directive 1816 indicates that articles from triathlete should be provided to athletes of expert experience level who engage in high intensity swimming, and prioritization directive 1812 indicates that articles from gym climber should be provided to any athletes engaged in the sport of climbing.

While no specific file format is provided for the records and profiles discussed herein, they may be stored as entries in a database, may be stored as Extensible Language Markup (XML) data, may be stored in a proprietary file format, etc.

News Feeds

With a discussion provided above with regard to data structure formats for a articles and profiles that facilitate the creation of news feeds, the following discussion focuses upon the creation and presentation of newsfeeds.

Figure 19:
FIG. 19 depicts a news feed format indicating an arrangement of articles as a news feed in an illustrative embodiment.

FIG. 19 depicts a news feed format 1900 indicating an arrangement of articles at a news feed in an illustrative embodiment. In this embodiment, the news feed format 1900 defines a predetermined set of feed positions, which are viewable on the display of a user device either directly or by scrolling. The news feed format 1900 lists article IDs to include at each slot, as well as presentation instructions, such as whether to emphasize an article or advertisement (e.g., with a distinct background, font, color, etc.). Another example of a presentation instruction is an instruction to present an article or advertisement via a specific technique, such as via a flying carpet, wherein scrolling causes new content to appear to float over content in a lower layer. In further embodiments, the news feed format 1900 includes a tag indicating a style sheet or other formatting guideline indicating how the articles are to be arranged at a display of the user device 104.

In still further embodiments, aggregation server 150 retains a variety of news feed formats 1900 in memory 156 that are each customized for a different type of user device 104. The aggregation server 150 selects a news feed format 1900 to provide to the user device 104 based on whether the user device 104 requesting the news feed is a cellular phone, tablet, laptop, or PC, and/or based on a resolution supported by the user device 104.

In one embodiment, the news feed is transmitted to a user device 104 for the athlete in a format that includes all articles and advertisements. In a further embodiment, the news feed is transmitted as a custom file that reports the locations of articles and advertisements, as well as links to the articles and advertisements at advertising server 140 and/or news feed providers 122. The user device 104 then dynamically assembles the news feed for display by retrieving content via these links. In yet another embodiment, the news feed is dynamically generated incrementally, such that aggregation server 150 selects additional articles for display in response to receiving input from the user device 104 that the user 106 has scrolled past a threshold number of articles. In this manner, the news feed is an endless stream in that aggregation server 150 dynamically selects and adds new articles to the news feed in response to the user 106 continuing to scroll through the news feed.

Figure 20:
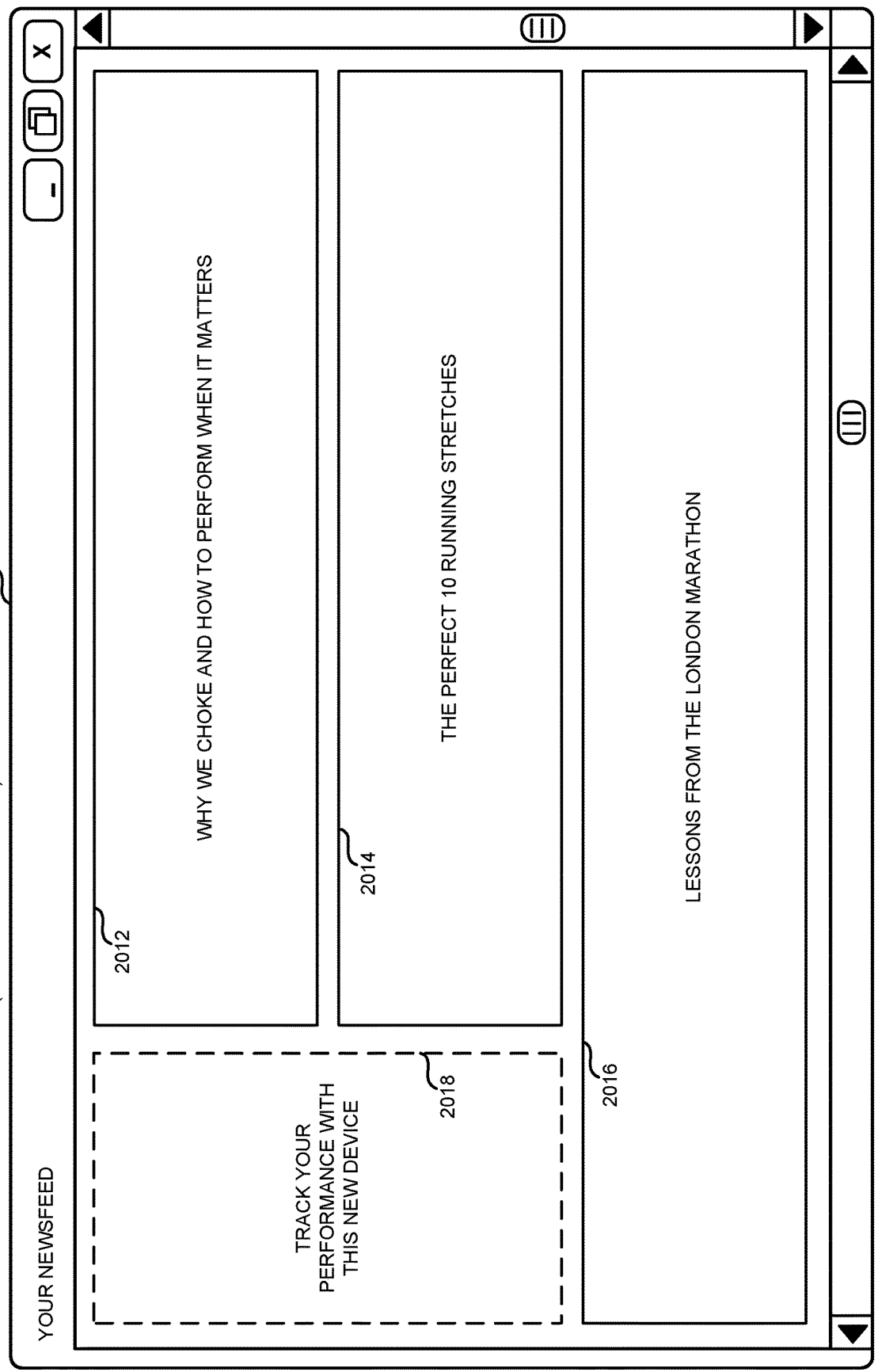
Figure 22:
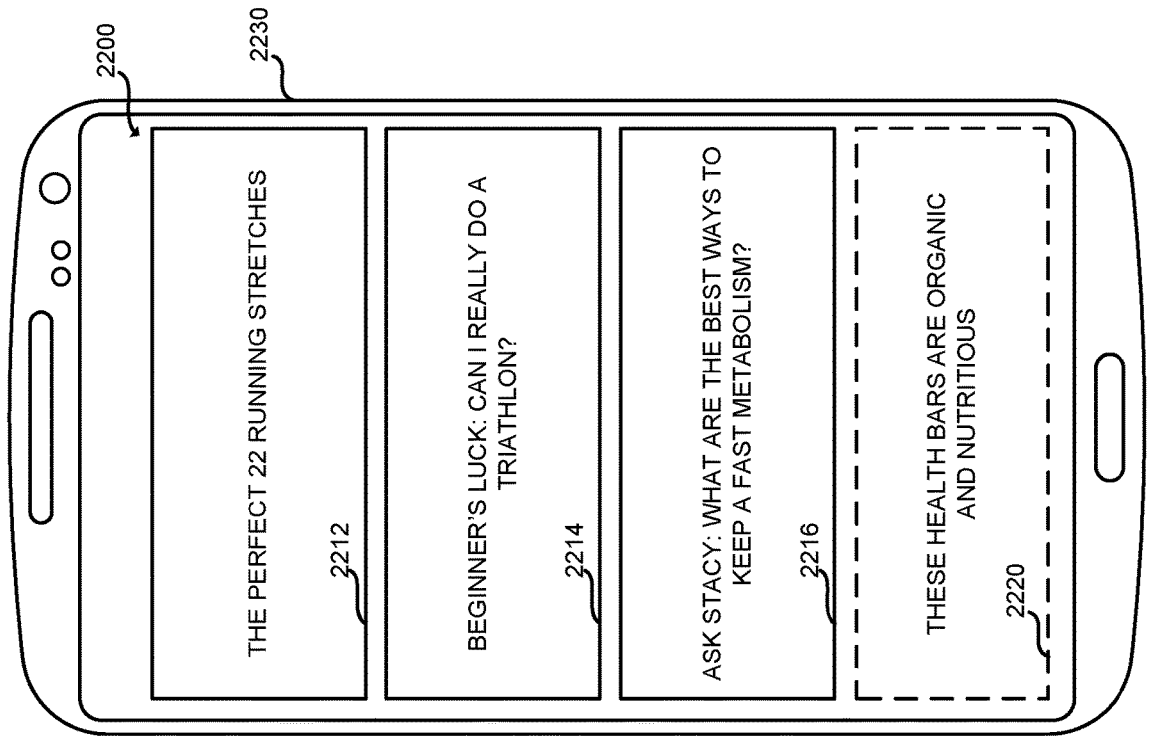

FIGS. 20-22 depict news feeds that have been generated by an aggregation server based on personal fitness histories of specific athletes in illustrative embodiments. In FIG. 20, the news feed 2000 is personalized for an athlete that engages in high intensity running with a competitive focus. Thus, the category of engagement of the athlete is running, with associated criteria of high intensity and competition. The news feed 2000 includes articles 2012, 2014, and 2016 which are classified as describing running and competition, and also includes an advertisement 2018 pertaining to gear that enables performance tracking. Each of the articles may be sourced from the same or a different news feed provider 122 as desired.

In FIG. 21, a customized news feed 2100 is provided to an athlete 102 that participates in triathlons and is fifty years old. The customized news feed 2100 includes articles 2112, 2114, and 2116 that are personalized to the fitness history, as well as the demographics of the athlete 102. An advertisement 2120 is also provided. Thus, a news feed may include customized selections based not just on fitness history, but also based on age, sex, or other criteria.

In FIG. 22, a personalized news feed 2200 is provided to an athlete 102 via a cellular phone 2230. In this embodiment, the athlete 102 engages in casual running, and has an expressed interest within their profile pertaining to metabolic health. In this embodiment, the personalized news feed 2200 includes articles 2212 and 2214, which are targeted to running at the beginner skill level. The personalized news feed 2200 also includes articles 2216, which pertaining to metabolic health. Thus, the news feed 2200 is based on a combination of categories of engagement indicated in a fitness history of the athlete, and interests listed on a profile of the athlete 102. An advertisement 2220 pertaining to dietary health supplements is also provided. FIG. 22 illustrates further variations between news feeds that may be implemented as a matter of design choice.

The systems and methods described herein provide a technical benefit to the field of athletics by enabling the delivery of information in a personalized and relevant manner to countless individual athletes on a massive scale, which is not possible via current techniques and network architectures. This improves the quality of life of those athletes by reducing their exposure to unwanted articles, and by providing relevant articles to athletes in a repeatable and ongoing manner.

EXAMPLES

In the following examples, additional processes, systems, and methods are described in the context of a network architecture for generating activity-based news feeds in real-time.

In this example, an athlete participates in triathlons. A coach for the athlete registers an account for the athlete at a tracking server 110 via a website, and accesses the account to report exercise activities for the athlete. The tracking server 110 utilizes the provided information to generate a profile for the athlete, as well as to compile a fitness history over time on an ongoing, real-time basis.

The athlete wears a fitness tracker in the form of a smart watch that automatically detects and records exercise performed by the athlete. The fitness tracker utilizes accelerometer data and GPS data to distinguish between swimming, running, and cycling activities of the triathlete. The fitness tracker reports these raw measurements of accelerometer and GPS data to a cellular phone that is paired with the fitness tracker. The cellular phone utilizes an app to analyze the raw measurements to create processed statistics describing speed, cadence (i.e., pedaling rate), and pedometry via known techniques. The cellular phone determines the start and end of exercise activities based on accelerometer data indicating that running, swimming, or cycling has initiated or ceased. The cellular phone compiles information for exercise activities into records on an activity-by-activity basis, and transmits new records to tracking server 110 as the records are created. Upon receiving a record, the tracking server 110 determines an athlete associated with the record, and updates a fitness history for the athlete to include the new record. The athlete is one of hundreds of thousands of athletes whose data is tracked and updated in this manner in real-time.

At the end of each day, the tracking server 110 proceeds through the records received for each athlete, and updates categories of engagement for the athlete. In this embodiment, the categories of engagement are determined based on the prior two weeks of exercise activities engaged in by the athlete, and include each type of exercise performed during the prior two weeks. Each time the coach or athlete 102 accesses the account for the athlete 102 through a mobile device, the aggregation server 150 transmits a message to repository 120. The message solicits articles that fall within the categories of engagement of the athlete 102. News feed providers 122 provide articles within the categories of engagement, and the aggregation server 150 ranks and weights the articles based on their adherence to the categories of engagement for the athlete, and based on the prioritization directives 158 stored in memory 156 of the aggregation server 150. The aggregation server 150 then acquires advertising based on the demographics of the athlete, and compiles the articles and the advertisements into a news feed. The news feed is then transmitted to a user device 104 for presentation.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Figure 23:
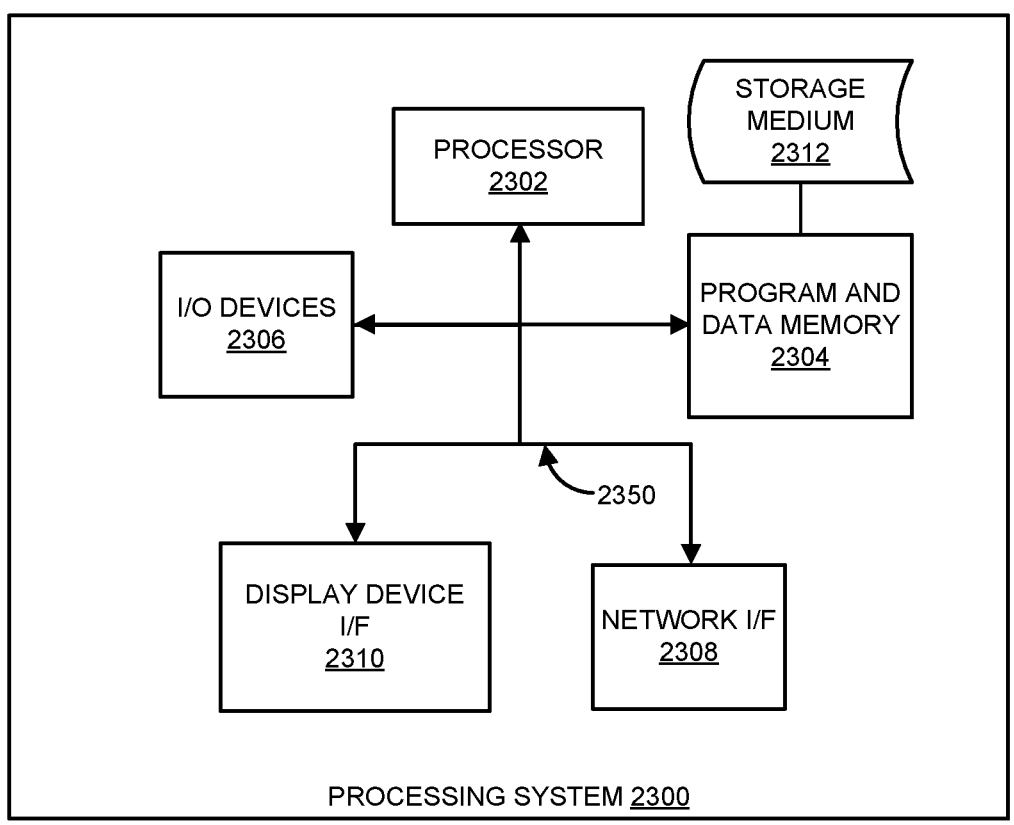
FIG. 23 depicts a computing system operable to execute programmed instructions embodied on a computer readable medium in an illustrative embodiment.

In one particular embodiment, instructions stored on a computer readable medium are used to direct a computing system of user device 104, tracking server 110, and/or other devices to perform the various operations disclosed herein. FIG. 23 illustrates an illustrative computing system 2300 operable to execute a computer readable medium embodying programmed instructions. Computing system 2300 is operable to perform the above operations by executing programmed instructions tangibly embodied on computer readable storage medium 2312. In this regard, embodiments of the invention can take the form of instructions (e.g., code) accessible via computer-readable medium 2312 for use by computing system 2300 or any other instruction execution system. For the purposes of this description, computer readable storage medium 2312 comprises any physical media that is capable of storing the program for use by computing system 2300. For example, computer-readable storage medium 2312 may be an electronic, magnetic, optical, electromagnetic, infrared, semiconductor device, or other non-transitory medium. Examples of computer-readable storage medium 2312 include a solid state memory, a magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and DVD.

Computing system 2300, which stores and/or executes the instructions, includes at least one processor 2302 coupled to program and data memory 2304 through a system bus 2350. Program and data memory 2304 include local memory employed during actual execution of the program code, bulk storage, and/or cache memories that provide temporary storage of at least some program code and/or data in order to reduce the number of times the code and/or data are retrieved from bulk storage (e.g., a spinning disk hard drive) during execution.

Input/output or I/O devices 2306 (including but not limited to keyboards, displays, pointing devices, etc.) may be coupled either directly or through intervening I/O controllers. Network adapter interfaces 2308 may also be integrated with the system to enable computing system 2300 to become coupled to other data computing systems or storage devices through intervening private or public networks. Network adapter interfaces 2308 may be implemented as modems, cable modems, Small Computer System Interface (SCSI) devices, Fibre Channel devices, Ethernet cards, wireless adapters, etc. Display device interface 2310 may be integrated with the system to interface to one or more display devices, such as screens for presentation of data generated by processor 2302.

Although specific embodiments are described herein, the scope of the disclosure is not limited to those specific embodiments. The scope of the disclosure is defined by the following claims and any equivalents thereof.

What is claimed is:

1. A method for automatically compiling and analyzing fitness histories of athletes in a population via a network architecture, the method comprising:
receiving metrics for exercise activities of the athletes in the population, each exercise activity comprising an instance of exercise performed by an athlete in the population;
generating records of the exercise activities of the athletes based on the metrics;
determining a type of exercise for each record;
classifying the records based on corresponding types of exercise; and
compiling a fitness history, for each athlete in the population, comprising records of exercise activities performed by the athlete; and
for each athlete in the population:
generating a digital news feed for the athlete;
analyzing the fitness history of the athlete, by automatically identifying categories of engagement for the athlete based on types of exercise indicated in the fitness history of the athlete;
selecting articles from a repository based on the categories of engagement for the athlete;
personalizing the digital news feed for the athlete by populating the digital news feed with the selected articles to customize the news feed; and
transmitting the digital news feed to a user device of the athlete for presentation at a display of the user device.

2. The method of claim 1 further comprising:
generating additional records of the exercise activities of the athletes over time based on the metrics.

3. The method of claim 1 further comprising:
altering the categories of engagement for each of the athletes by: reviewing records of exercise activities for the athlete across a retrospective review period.

4. The method of claim 1 further comprising:
determining, for each of the athletes, an intensity level for each category of engagement by analyzing the records for the athlete, wherein
selecting articles from the repository is based on the intensity level for each category of engagement for the athlete.

5. The method of claim 1 further comprising:
altering categories of engagement for the athletes on an ongoing basis as the athletes perform new exercise activities, and
selecting new articles from the repository based on the altered categories of engagement.

6. The method of claim 1 wherein:
the metrics include at least one piece of information selected from the group consisting of: scheduled events listed on a calendar, a workout history, reported event attendance for the athlete, a dietary log of the athlete, and a wellness log of the athlete.

7. The method of claim 1 wherein:
the metrics include at least one measurement selected from the group consisting of: sleep tracking data, step tracking data, heart rate data, elevation data, accelerometer data, pulse data, and audio data.

8. The method of claim 1 further comprising:
defining, for each of the athletes, an order of presentation of the articles at the news feed based on the fitness history of the athlete.

9. The method of claim 1 wherein:
the fitness histories include exercise activities dynamically determined by user devices of the athletes.

10. A non-transitory computer readable medium embodying programmed instructions which, when executed by a processor, are operable for performing a method for automatically compiling and analyzing fitness histories of athletes in a population, the method comprising:
receiving metrics for exercise activities of the athletes in the population, each exercise activity comprising an instance of exercise performed by an athlete in the population;
generating records of the exercise activities of the athletes based on the metrics;
determining a type of exercise for each record;
classifying the records based on corresponding types of exercise; and
compiling a fitness history, for each athlete in the population, comprising records of exercise activities performed by the athlete; and
for each athlete in the population:
generating a digital news feed for the athlete;
analyzing the fitness history of the athlete, by automatically identifying categories of engagement for the athlete based on types of exercise indicated in the fitness history of the athlete;
selecting articles from a repository based on the categories of engagement for the athlete;
personalizing the digital news feed for the athlete by populating the digital news feed with the selected articles to customize the news feed; and
transmitting the digital news feed to a user device of the athlete for presentation at a display of the user device.

11. The non-transitory computer readable medium of claim 10 further comprising:
generating additional records of the exercise activities of the athletes over time based on the metrics.

* * * * *